United States Patent [19]

Takahashi et al.

[11] Patent Number: 5,402,955
[45] Date of Patent: Apr. 4, 1995

[54] REEL-LOCKING MECHANISM FOR COMPACT TAPE CASSETTE

[75] Inventors: Hitoshi Takahashi; Hiroshi Sonobe; Keiichi Maeda, all of Mito, Japan

[73] Assignee: Victor Company of Japan, Ltd., Yokoyama, Japan

[21] Appl. No.: 918,591

[22] Filed: Jul. 24, 1992

Related U.S. Application Data

[63] Continuation-in-part of Ser. No. 744,436, Aug. 13, 1991, Pat. No. 5,326,047.

[30] Foreign Application Priority Data

Jul. 25, 1991 [JP] Japan .................... 3-065893 U
Sep. 30, 1991 [JP] Japan .................... 3-087535 U
Jan. 31, 1992 [JP] Japan .................... 4-010499 U

[51] Int. Cl.⁶ .................................... G11B 23/087
[52] U.S. Cl. .................... 242/338.3; 242/343.2; 360/132
[58] Field of Search ............. 242/197, 198, 199, 204, 242/343.1, 343.2, 338.1, 338.3; 360/132

[56] References Cited

U.S. PATENT DOCUMENTS 4,472,753  9/1984  Wulfing ................ 242/198 X
4,635,878  1/1987  Didriksen ............. 242/198
4,638,393  1/1987  Oishi et al. .......... 242/198 X
4,702,434  10/1987 Brauer ................ 242/198

FOREIGN PATENT DOCUMENTS 49-129516  11/1974  Japan .
52-100729  7/1977   Japan .
57-92471   6/1982   Japan .
60-197986  10/1985  Japan .

Primary Examiner—Daniel P. Stodola
Assistant Examiner—John Q. Nguyen
Attorney, Agent, or Firm—Pollock, Vande Sande & Priddy

[57] ABSTRACT

A cassette has supply and take up reels with corresponding annular gears thereon. A pivotally mounted driving brake arm has an intermediately positioned pawl engaging the take up reel gear. An end of the driving brake arm is spaced from a coacting end of a pivotally mounted driven brake arm. An opposite end of the driven brake arm has a pawl for engaging the gear of the supply reel. When the tape is slack, the tape up reel incrementally rotates to tighten it, causing the take up reel pawl to incremental ratchet over the mating gear. This causes the driving arm to rotate and displace its end into abutting relation with the coacting end of the driven arm. Consequently, the ratchet of the driven brake arm rotates and its corresponding pawl disengages from the supply reel gear to allow the supply reel to incrementally pay out a length of tape sufficient to prevent overtightening.

14 Claims, 22 Drawing Sheets

REEL-LOCKING MECHANISM FOR COMPACT TAPE CASSETTE

CROSS REFERENCE TO RELATED APPLICATION

This application is a continuation-in-part of application Ser. No. 07/744,436, filed Aug. 13, 1991 for "COMPACT SIZE TAPE CASSETTE", now U.S. Pat. No. 5,326,047, assigned to the assignee of the instant application.

BACKGROUND OF THE INVENTION

The present invention relates generally to a compact size tape cassette which is smaller in size to a standard size tape cassette used widely in magnetic recording and/or reproducing apparatus such as home video tape recorders (VTRs), and hence requires an adapter when used in the home video tape recorders. More particularly, this invention relates to a compact size tape cassette having an improved pair of brake mechanisms associated with a supply reel hub and a take-up reel hub, respectively, in interlocked relation to one another to perform a reel hub releasing operation simultaneously and reliably.

As is well known, a standard size tape cassette is used widely in home video tape recorders. There has been developed a compact size tape cassette which is smaller in size than the standard size tape cassette and can be recorded and reproduced by the home video tape recorder while the compatibility with the standard size tape cassette is maintained.

The compact size tape cassette can be recorded and reproduced not only by a compact video tape recorder of a construction for exclusive use with the compact size tape cassette, but also by the home video tape recorders of a construction for exclusive use with the standard size tape cassette. In the latter case, however, the compact size tape cassette must be accommodated in a tape cassette adapter having a size identical to the size of the standard size tape cassette.

Aside from the spread of the home video tape recorders, an all-in-one video camera and recorder called a VTR with camera has recently been manufactured. In the VTR with camera, the compact size tape cassette of a smaller size than the standard size tape cassette is used in order to reduce the size and weight of the VTR with camera, thereby improving the portability of the VTR with camera.

FIG. 31 of the accompanying drawings is a perspective view of a compact size tape cassette 1 shown with its guard panel or lid disposed in the open position.

The compact size tape cassette 1, as shown in FIG. 31, includes a magnetic tape 2 contained in a housing 3 composed of an upper shell 4 and a lower shell 5 assembled together, and a guard panel or lid 6 hinged to opposite side walls of the housing 3 for opening and closing a front opening of the housing 3. Designated by 16 is a vertical pin-receiving hole for receiving a brake-releasing pin, 21 a take-up reel hub, and 25 a supply reel hub.

The magnetic tape 2 extends across the front opening of the housing 3 while they are guided around left and right guide rollers 10, 10 provided at opposite ends of the front opening. The magnetic tape 2 is protected by the lid 6 which is normally disposed in the closed position. The lower shell 5 has a cutout recess 11 through which a toothed gear 23 formed on a periphery of a lower annular flange 22 of the take-up reel hub 21 faces to the right side wall (left-hand side in FIG. 31) of the housing 3. The recess 11 is defined when the upper and lower shells 4 and 5 are assembled. The lid 6 is selectively held in the open position and the closed position in a clicking manner by means of a slider 14 which is urged forwardly into snapping engagement with a portion of the lid 6 by the force of a plate spring 13 fitted in a U-shaped groove 12 in the right side wall of the housing 3. The housing 3 also has a vertical positioning groove 15 for preventing mis-loading of the compact size tape cassette 1. The positioning groove 15 is formed behind the recess 11 and extends substantially across the height of the upper and lower shells 4 and 5.

When the compact size tape cassette 1 of the foregoing construction is used in a compact video tape recorder (not shown), it is loaded from an opening into the body of the compact video tape recorder until its arrival at a predetermined position in which the lid 6 is pivoted to the substantially horizontal open position such as shown in FIG. 31. Then, the compact size tape cassette 1 is lowered so that a supply reel hub 25 fits with a supply reel disc (not shown) and the toothed gear 23 on the periphery of the lower annular flange 22 of the tape-up reel hub 21 meshes with a drive gear (not shown) of the compact video tape recorder. In this instance, two pairs of vertical and oblique loading pins (not shown) and a capstan (not shown) are received in first, second and third recesses 7, 8 and 9, respectively, at the front side of the compact size tape cassette 1.

The compact size tape cassette 1 thus loaded can be recorded and/or reproduced by the compact video tape recorder.

On the other hand, when the compact size tape cassette 1 is used in a home video tape recorder (not shown), it is loaded by using either a tape cassette adapter which, as shown in Japanese Utility Model Publication No. 60-37739, has a size identical to the size of the standard size tape cassette, or a cassette tray on which a standard size tape cassette and a compact size tape cassette are placed.

As described above, the standard size tape cassette and the compact size tape cassette used in the video tape recorders include a housing containing a pair of reel hubs around which a magnetic tape is wound. In the recording and reproducing modes of operation, the magnetic tape wound on the supply reel hub is pulled out from the front opening of the housing, then travels along a magnetic head of the video tape recorder, subsequently returns from the front opening into the housing, and finally is wound on the take-up reel hub. In the rewinding mode of operation, the magnetic tape is fed directly from the take-up reel hub to the supply reel hub.

Each of the supply reel hub and the take-up reel hub is provided with a brake mechanism which is operative to prevent the corresponding reel hub from rotating accidentally. When the housing is subjected to an impact force or shock during transportation or handling of the tape cassette, the supply reel hub or the take-up reel hub tends to turn accidentally, thereby placing the magnetic tape into a slackened condition which will cause various deficiencies such as uneven rotation of the reel hubs, folding of the magnetic tape, and rupturing of the magnetic tape. These deficiencies can be overcome by the brake mechanisms associated with the reel hubs.

FIG. 32 is a perspective view of the compact size tape cassette, with the upper shell omitted for clarity.

As shown in FIG. 32, the supply reel hub 25 and the take-up reel hub 21 are received in the lower shell 5 with the magnetic tape wound around the reel hubs 21, 25. The supply reel hub 25 and the take-up reel hub 21 are provided with the corresponding ones of the brake mechanisms. A take-up reel stopper 31 is non-rotatably mounted on a support shaft 17 upstanding from a portion of an inside surface of the lower shell 5 adjacent to the take-up reel hub 21.

The brake mechanism associated with the supply reel hub 25 includes, as shown in FIG. 33, a plurality of circumferentially spaced radial ribs 18 disposed on an under surface of a lower annular flange 26 of the supply reel hub 25, and a plurality of circumferentially spaced radial ribs 19 disposed on an inside surface of the lower shell 5 in confronting relation to the radial ribs 18. The ribs 18 and the ribs 19 have a trapezoidal cross-section. In the assembled condition shown in FIG. 31, the supply reel hub 25 is urged downwardly toward the inside surface of the lower shell 5 by means of a reel spring (not shown) fixedly mounted on the inside surface of the upper shell 4. In this instance, the ribs 18 on the under surface of the lower annular flange 26 of the supply reel hub 25 mesh with ribs 19 on the lower shell 5 to provide a braking effect on the supply reel hub 25 so that the supply reel hub 25 is normally locked in position against rotation relative to the lower shell 5.

Thus, the brake mechanism associated with the supply reel hub 25 is composed of the radial ribs 18 on the under surface of the lower annular flange 26 of the supply reel hub 25 and the radial ribs 19 on the inside surface of the lower shell 5.

This brake mechanism is released when, after the compact size tape cassette is loaded in a video tape recorder, a supply reel spindle of the video tape recorder or of the tape cassette adapter is inserted into the supply reel hub 25 from the bottom thereof and lifts up the supply reel hub 25 from the inside surface of the lower shell 5, thereby disengaging the radial ribs 18 and the radial ribs 19.

The brake mechanism associated with the take-up reel hub 21 includes, as shown in FIG. 34, a plurality of downwardly facing triangular teeth 32 disposed on a lower part of the take-up reel stopper 31 non-rotatably mounted on the support shaft 17 upstanding from a portion of the inside surface of the lower shell 5 adjacent to the take-up reel hub 21. The reel stopper 31 is urged downwards by means of a spring (not shown) so that the teeth 32 of the reel stopper 31 are brought into meshing engagement with the toothed gear 23 on the periphery of the lower flange 22 of the take-up reel hub 21 to provide a braking effect on the take-up reel hub 21. Thus, the take-up reel hub 21 is normally locked in position against rotation relative to the lower shell 5.

As appears clear from the foregoing description, the brake mechanism associated with the take-up reel hub 21 is composed of the non-illustrated spring, the triangular teeth 32 of the reel stopper 31, and the toothed gear 23 on the periphery of the lower flange 22 of the take-up reel hub 21.

This brake mechanism is released when, after the compact size tape cassette is loaded in a video tape recorder, a brake-releasing pin (not shown) of the video tape recorder is inserted into the pin-receiving hole 16 in the lower shell 5 from the bottom thereof and lifts up the take-up reel stopper 31 from the inside surface of the lower shell 5, thereby disengaging the teeth 32 on the take-up reel stopper 31 and the teethed gear 23 on the take-up reel hub 21.

However, since the braking operation of the brake mechanisms, which are associated with the supply and take-up reel hubs 25, 21 of the conventional compact size tape cassette 1 shown in FIGS. 31 through 34, relies on the force of the springs, the reel hubs 25, 21 are likely to turn against the force of the springs when an external shock is imparted on the compact size tape cassette 1.

In addition, the conventional brake mechanisms are unable to retain the magnetic tape 2 within the housing 3 when the magnetic tape 2 is pulled out while the lid 6 is being manually opened.

With the foregoing drawbacks of the conventional compact side tape cassette in view, various improvements have been proposed by the present assignee, as described in U.S. patent application Ser. No. 07/744,436 filed Aug, 13, 1991. According to a preferred embodiment described in the prior application, there is provided a compact size tape cassette which comprises a supply reel hub and a take-up reel hub rotatably mounted within a housing, with a magnetic tape wound around the reel hubs, and a pair of brake mechanisms associated with the take-up reel hub and supply reel hub, respectively, for locking the reel hubs in position against rotation relative to the housing, wherein the brake mechanisms are interlocked such that a releasing operation of one brake mechanism is transmitted to the other brake mechanism for causing a releasing operation of the other brake mechanism in synchronism with the releasing operation of the one brake mechanism.

In the compact size tape cassette of the prior application, the supply reel hub and the take-up reel hub are rotatable in one direction to wind up the magnetic tape but they are prevented by the brake mechanisms from rotating in the opposite direction to slacken the magnetic tape. With this construction, when the magnetic tape is slacken due to some reasons, or when the user misunderstands a normal play of the magnetic tape as a slack, an attempt by the user to take up the slack may result in over-tensioning of the magnetic tape. If such over-tensioning occurs, a displaceable reel hub, namely the supply reel hub is pulled by the tension of the magnetic tape toward a path of movement of the magnetic tape, thus making it difficult to receive the compact size tape cassette in a tape cassette adaptor or to load the compact size tape cassette in a compact video tape recorder.

This difficulty has been overcome by a compact size tape cassette according to another preferred embodiment of the invention described in the prior application, in which the brake mechanisms are automatically released by a brake-releasing mechanism when the compact size tape cassette is received in the tape cassette adaptor or loaded in the compact video tape recorder even if the magnetic tape is over-tensioned.

The last-mentioned compact size tape cassette is not fully satisfactory in that when the tape cassette with its magnetic tape held in an over-tensioned condition is allowed to stand without being received in the cassette tape adaptor or loaded in the compact video tape recorder, the over-tensioned magnetic tape is likely to be permanently stretched or otherwise deformed or to deform a structural part of the tape cassette which is provided to guide the magnetic tape.

SUMMARY OF THE INVENTION

It is, therefore, an object of the present invention to provide a compact size tape cassette incorporating structural features which are capable of protecting a magnetic tape against undue tensioning when the magnetic tape is wound up.

According to a first aspect of the present invention, there is provided a compact size tape cassette which comprises a housing, a supply reel hub and a take-up reel hub rotatably mounted within the housing, with a magnetic tape wound around the reel hubs, and a first brake mechanism and a second brake mechanism associated with the take-up reel hub and the supply reel hub, respectively, for locking the reel hubs in position against rotation relative to the housing. The first and second brake mechanisms are interlocked such that a releasing operation of one of the first and second brake mechanisms is transmitted to the other of the first and second brake mechanisms for causing a releasing operation of the other brake mechanism in synchronism with the releasing operation of the one brake mechanism. The first locking mechanism has a first engagement portion and the second locking mechanism has a second engagement portion. The first engagement portion is normally spaced from the second engagement portion and is engageable with the second engagement portion when the releasing operation of the one brake mechanism is transmitted to the other brake mechanism. At least one of the first and second engagement portions has a projection constructed to reduce a spacing between the first and second engagement portions.

Since the spacing between the first and second engagement portions is reduced by the projection, when the take-up reel is forced to turn in a direction to take up the magnetic tape under the condition that the first and second brake mechanism are disposed in an operating (braking) position, a locking pawl of the first brake mechanism slides on teeth of a toothed gear on the take-up reel hub, thereby intermittently bringing the second brake mechanism into an inoperative (releasing) position. Accordingly, while the take-up reel hub is turned to take up slack of the magnetic tape, the supply reel hub is rotatable in a direction to pay out the magnetic tape. Thus, overtensioning of the magnetic tape can be avoided.

According to a second aspect of the present invention, there is provided a compact size tape cassette which comprises a housing, a supply reel hub and a take-up reel hub rotatably mounted within the housing. There is a magnetic tape wound around the reel hubs, the supply reel having an annular flange, and a first brake mechanism and a second brake mechanism associated with the take-up reel hub and the supply reel hub, respectively, for locking the reel hubs in position against rotation relative to the housing. The first and second brake mechanisms are interlocked such that a releasing operation of the first brake mechanism is transmitted to the second brake mechanism for causing a releasing operation of the second brake mechanism in synchronism with the releasing operation of the first brake mechanism. The second brake mechanism includes a toothed gear formed on a periphery of the annular flange of the supply reel hub, and a locking pawl normally held in mesh with teeth of the toothed gear. The locking pawl has a front surface extending obliquely to a crest of each tooth of the toothed gear. The front surface is dimensioned such that when the supply reel hub is turned in a direction to pay out the magnetic tape, teeth of the toothed gear are slidable on the front surface of the locking pawl.

With this construction, the supply reel hub is turned by the tension on the magnetic tape in the direction to pay out the magnetic tape, the teeth of the toothed gear on the supply reel hub are slidable on the front surface of the locking pawl even when a brake releasing timing of the second brake mechanism retarded due to some reasons. During that time, the toothed gear urges the locking pawl in a direction away from the teeth of the toothed gear, thereby assisting the second brake mechanism in performing the brake-releasing operation.

According to a third aspect of the present invention, there is provided a compact size tape cassette which comprises a housing, a supply reel hub and a take-up reel hub rotatably mounted within the housing, with a magnetic tape wound around the reel hubs, and a first brake mechanism and a second brake mechanism associated with the take-up reel hub and the supply reel hub, respectively, for locking the reel hubs in position against rotation relative to the housing. The first and second brake mechanisms are interlocked such that a releasing operation of the first brake mechanism is transmitted to the second brake mechanism for causing a releasing operation of the second brake mechanism in synchronism with the releasing operation of the first brake mechanism. The first brake mechanism includes means for transferring the releasing operation of the first brake mechanism to the second brake mechanism. The transferring means includes an engagement portion engageable with a portion of the second brake mechanism. The engagement portion has an outwardly projecting curved contact portion.

Since the curved contact portion provides a small friction acting between itself and the mating portion of the second brake mechanism, the engagement portion of the first brake mechanism and the corresponding engagement portion of the second brake mechanism are movable smoothly when the first and second brake mechanism return to their original braking positions under the force of springs.

According to a fourth aspect of the present invention, there is provided a compact size tape cassette which comprises a housing, a supply reel hub and a take-up reel hub rotatably mounted within the housing, with a magnetic tape wound around the reel hubs, the take-up reel having an annular flange. A first brake mechanism and a second brake mechanism are associated with the take-up reel hub and the supply reel hub, respectively, for locking the reel hubs in position against rotation relative to the housing. The first and second brake mechanisms are interlocked such that a releasing operation of the first brake mechanism is transmitted to the second brake mechanism for causing a releasing operation of the second brake mechanism in synchronism with the releasing operation of the first brake mechanism. The first brake mechanism includes a toothed gear formed on a periphery of the annular flange of the take-up reel hub, and a locking pawl normally held in mesh with teeth of the toothed gear. The locking pawl has a projection at its front end. The projection is normally held in mesh with teeth of the toothed gear and is slidable on the teeth of the toothed gear for intermittently releasing the second brake mechanism when the take-up reel hub is rotated in a direction to take up the magnetic tape.

With the projection thus provided, when the take-up reel is forced to turn in a direction to take up the magnetic tape under the condition that the first and second brake mechanism are disposed in an operating (braking) position, a locking pawl of the first brake mechanism slides on teeth of a toothed gear on the take-up reel hub, thus intermittently bringing the second brake mechanism into an inoperative (releasing) position. Accordingly, while the take-up reel hub is turned to take up a slack of the magnetic tape, the supply reel hub is rotatable in a direction to pay out the magnetic tape.

The above and other objects, features and advantages of the present invention will become more apparent from the following description when making reference to the detailed description and the accompanying sheets of drawings in which preferred structural embodiments incorporating the principles of the present invention are shown by way of illustrative examples.

DETAILED DESCRIPTION OF THE PREFERRED EMBODIMENTS

Figure 1:
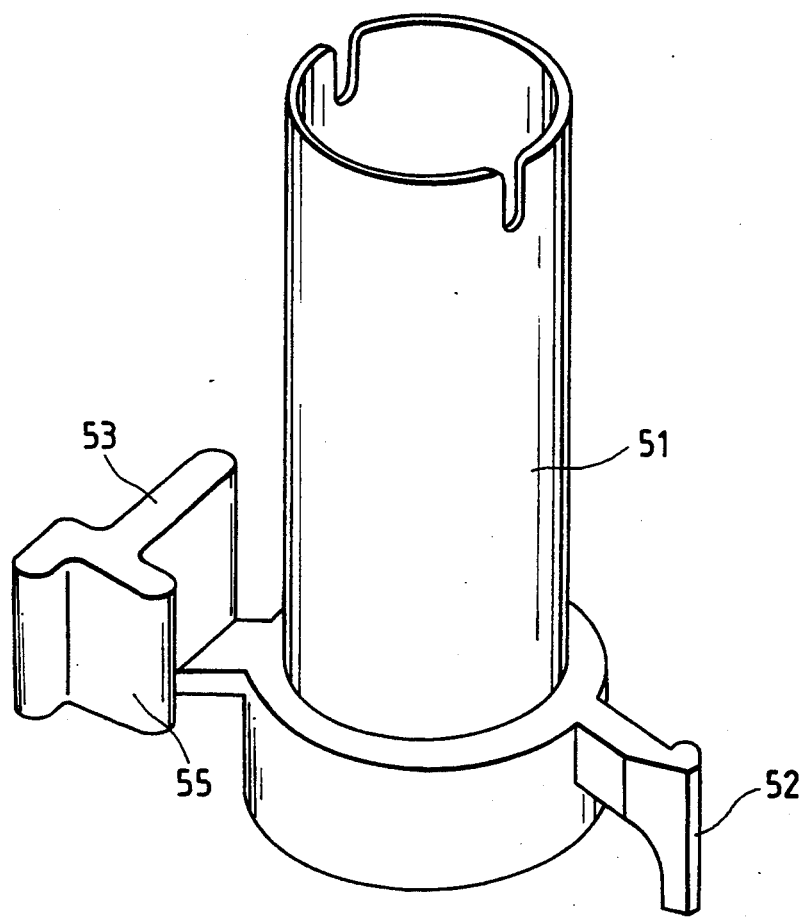
FIG. 1 is a perspective view of a brake member of a compact size tape cassette according to a first embodiment of the present invention.

The present invention will be described in greater detail with reference to certain preferred embodiments shown in the accompanying drawings in which like reference characters designate like or corresponding parts throughout the several views.

FIGS. 26 through 30 show the general construction of a compact size tape cassette embodying the present invention. These parts of the compact size tape cassette which are structurally the same as those of the compact size tape cassette 1 shown in FIGS. 31-34 are designated by the same reference characters, and a further description thereof will be omitted.

The compact size tape cassette of the invention includes a supply reel hub 25 and a take-up reel hub 21 winding therearound a magnetic tape 2, and first and second brake mechanism 40 and 50 associated with the take-up reel hub 21 and the supply reel hub 25, respectively, for locking them in position against rotation. The first and second brake mechanism 40 and 50 are interlocked such that a releasing operation of the first brake mechanism 40 is transmitted to the second brake mechanism 50 to cause a releasing operation of the second brake mechanism 50 in synchronism with the releasing operation of the first brake mechanism 40.

Figure 30:
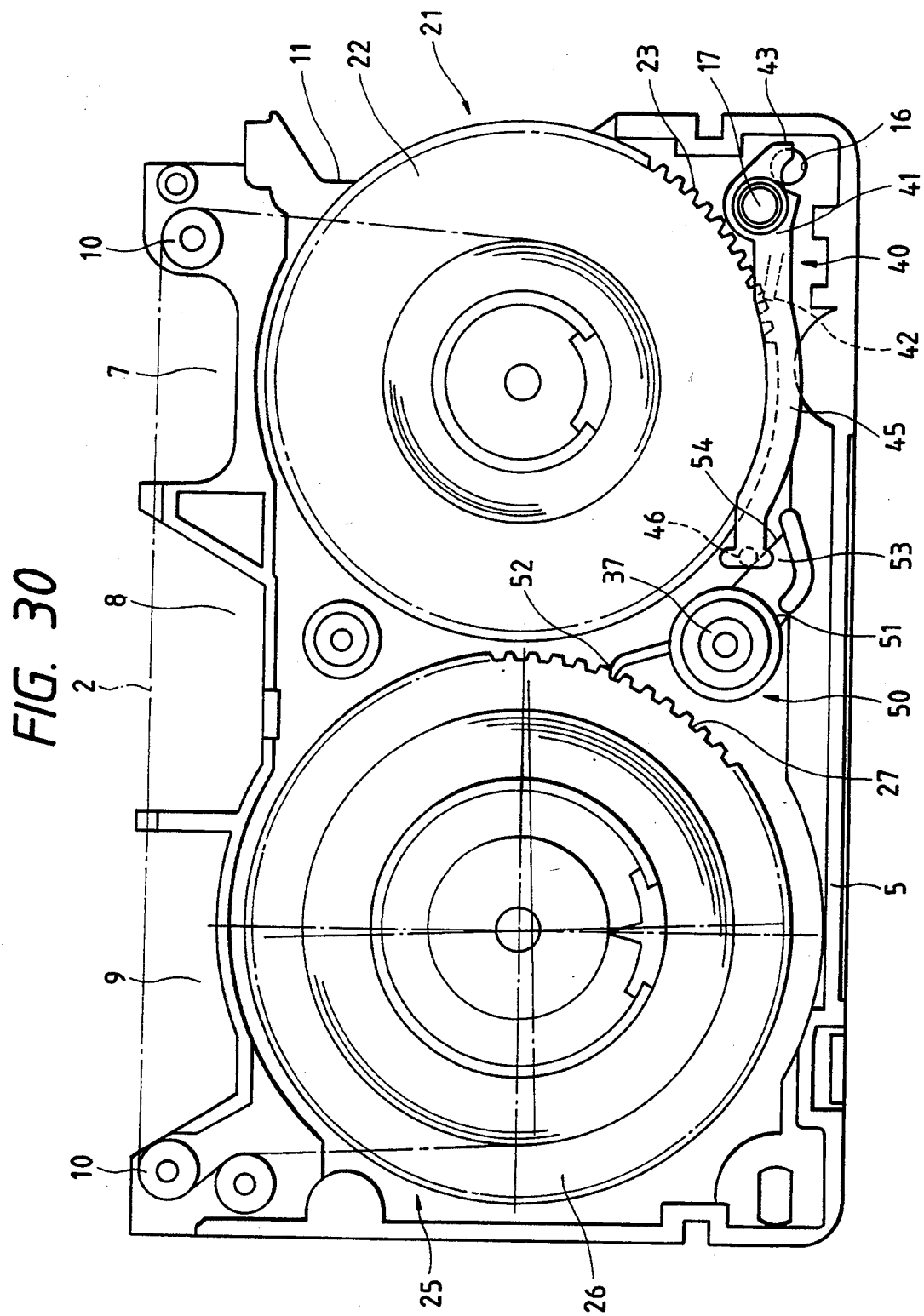
FIG. 30 is a plan view of the compact size tape cassette shown in FIG. 29, the view showing a condition in which the supply reel hub is pulled in a tape pay-out direction by the tension on a magnetic tape.
Figure 31:
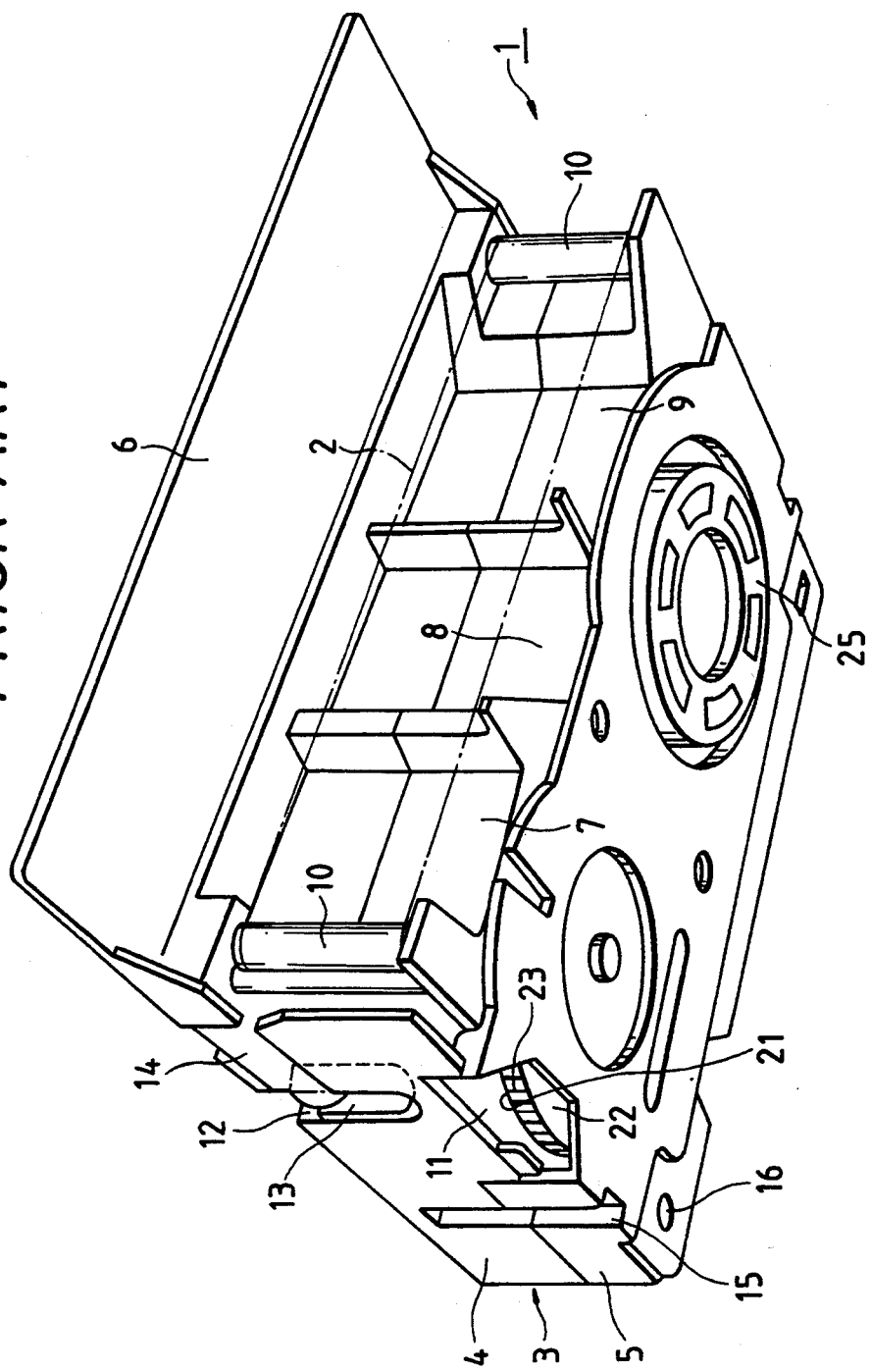
FIG. 31 is a perspective view of a conventional compact size tape cassette shown with a lid in the open position.
Figure 32:
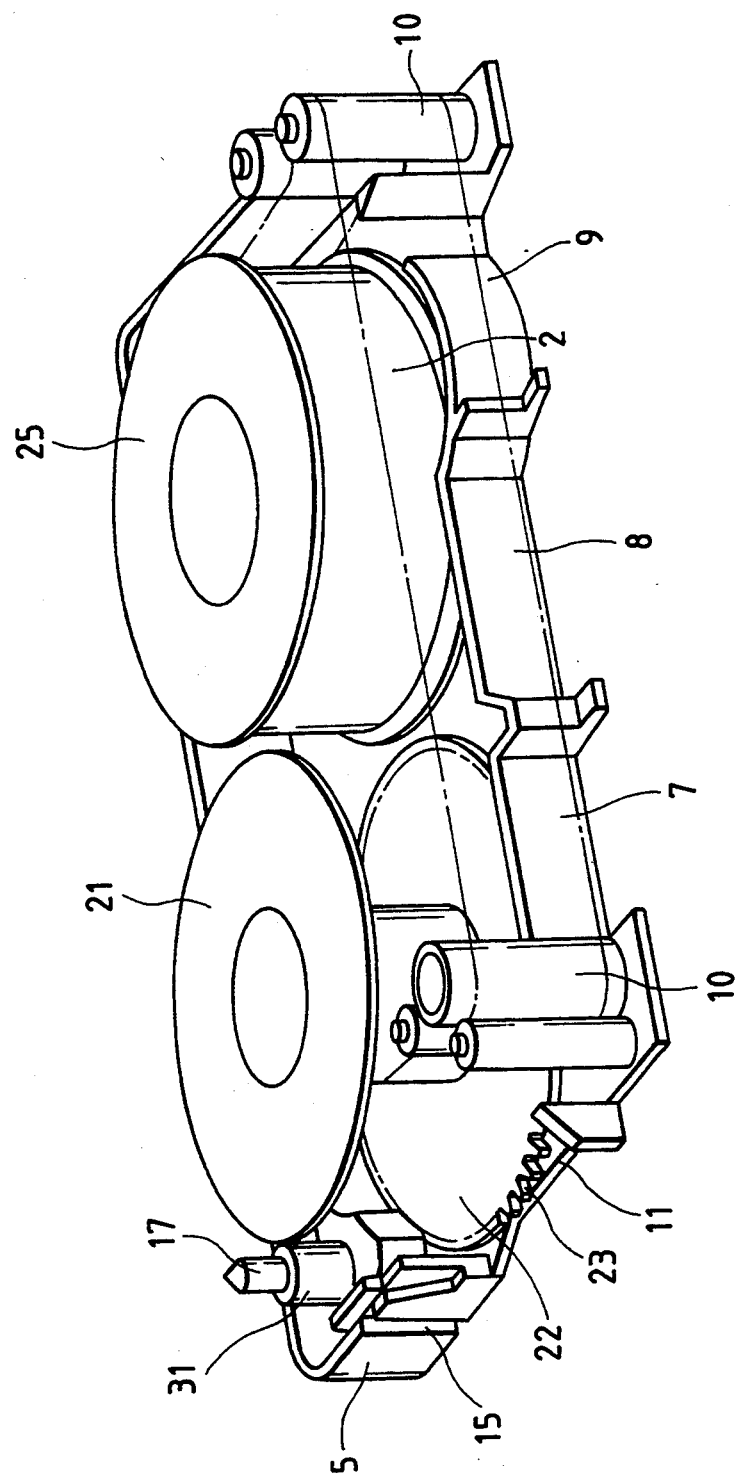
FIG. 32 is a perspective view of the conventional compact size tape cassette, with an upper shell omitted for clarity.
Figure 33:
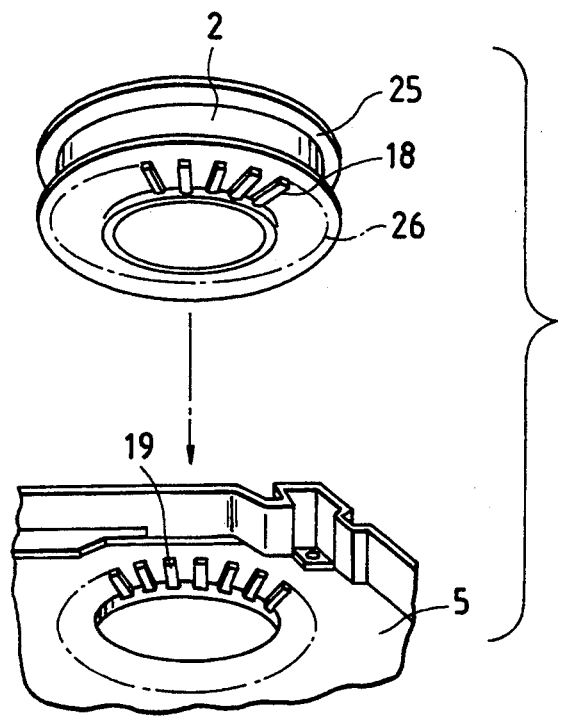
FIG. 33 is an exploded fragmentary perspective view showing a brake mechanism associated with a supply reel hub of the conventional compact size tape cassette.
Figure 34:
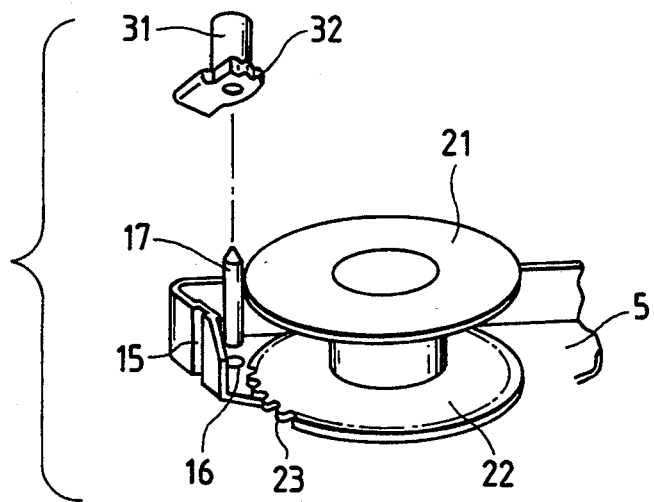
FIG. 34 is an exploded fragmentary perspective view showing a brake mechanism associated with a take-up reel hub of the conventional compact size tape cassette.

The compact size tape cassette of the invention is different from the conventional compact size tape cassette 1 shown in FIG. 31 in that the take-up reel stopper 31 and the non-illustrated spring are removed and the first and second brake mechanisms 40 and 50 are added. Aside from the brake mechanisms 40 and 50, the compact size tape cassette further has a housing 3 composed of an upper shell (not shown but substantially identical to the upper shell 4 shown in FIG. 31) and a lower shell 5. The tape also has first and second support shafts 17 and 37 upstanding from an inside surface of the lower shell 5, a cutout recess 11 (FIGS. 26 and 30) formed in the lower shell 5, a vertical pin-receiving hole 16 (FIGS. 27 and 30) receptive of a brake-releasing pin 36 of the video tape recorder, three recesses 7, 8 and 9 (FIG. 30) provided at the front side of the compact size tape cassette, and a pair of guide rollers 10 (FIG. 30). Though not shown, the compact size tape cassette further has a protective panel or lid identical to the lid 6 shown in FIG. 31, a slider identical to the slider 14 shown in FIG. 31, a U-shaped groove identical to the U-shaped groove 12 shown in FIG. 31, a plate spring 13 shown in FIG. 31, and a vertical positioning groove identical to the vertical positioning groove 15 shown in FIG. 31.

The supply reel hub 25 has a toothed gear 27 formed on a periphery of a lower annular flange 26 of the reel hub 25. The take-up reel hub 21 has a toothed gear 23 formed on the periphery of a lower annular flange 22 of the reel hub 21. The shape of each of the toothed gears 27 and 23 is not limited to that shown in the illustrated embodiment.

The first brake mechanism 40 associated with the take-up reel hub 21 is composed of a brake arm 41 and a spring 49.

Figure 26:
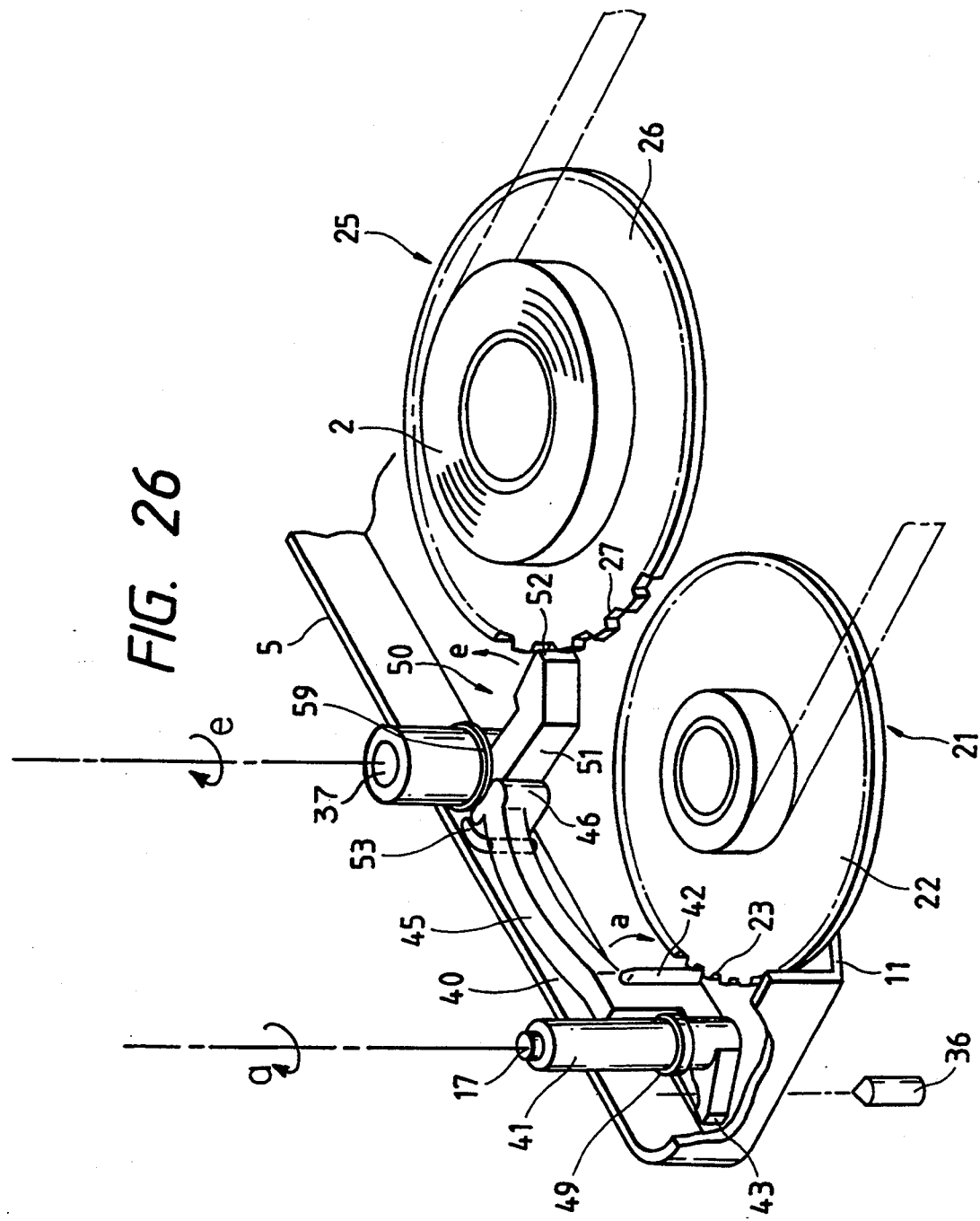
FIG. 26 is a fragmentary schematic perspective view of a main portion of a compact size tape cassette, with an upper shell omitted for clarity, according to the present invention.
Figure 27:
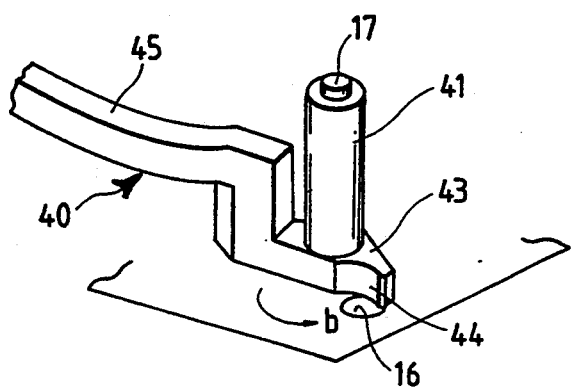
FIG. 27 is a perspective view showing a first brake mechanism associated with a take-up reel hub of the compact size tape cassette shown in FIG. 26.

As shown in FIGS. 26 and 27, the brake arm 41 is rotatably mounted on the first support shaft 17 upstanding from the inside surface of the lower shell 5 at a position adjacent to the take-up reel hub 21. The spring 49 is a torsion coil spring loosely fitted around a cylindrical body of the brake arm 41 and urges the brake arm 41 to turn in a direction indicated by the arrow a in FIG. 26.

The brake arm 41 includes a locking pawl 42 normally held in mesh with the toothed gear 23 of the take-up reel hub 21 by the force of the spring 49 tending to turn the brake arm 41 in the direction of the arrow a, a pin engagement portion 43 engageable with the brake-releasing pin 36 of the video tape recorder and adapted to be urged by the pin 36 in a direction indicated by the arrow b (FIG. 27) to turn the brake arm 41 in that direction about the support shaft 17. Also included is an arm 45 extending toward the second brake mechanism 50 associated with the supply reel hub 25, and an engagement portion in the form of an actuating pin 46 (FIG. 5) provided on a distal end (forward end) of the arm 45 and engageable with a brake member 51 of the second brake mechanism 50 for transmitting the movement of the locking pawl 42 to the second brake mechanism 50 (and an engagement portion of the brake member 51, in particular). The pin engagement portion 43 has an oblique side wall 44 (FIG. 27) engageable with the brake-releasing pin 36.

Figure 28:
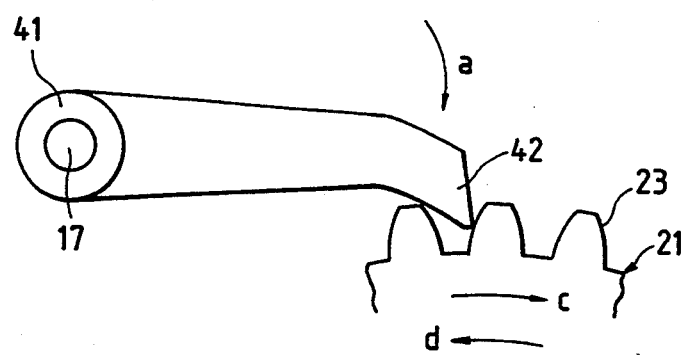
FIG. 28 is an enlarged plan view of a portion of the first brake mechanism.

As shown in FIG. 28, the support shaft 17 upstanding from the inside surface of the lower shell 5 is located in a plane extending substantially in tangential relation to the periphery of the toothed gear 23 of the take-up reel hub 21. With this location of the support shaft 17, by properly selecting the shape of the locking pawl 42 of the brake arm 41 such that the locking pawl 42 is closely fitted with the gear teeth of the toothed gear 23 of the take-up reel hub 21, it is possible to prevent the take-up reel hub 21 from rotating in the direction of the arrow d (in a direction to slacken the magnetic tape 2 wound on the take-up reel hub 21) while permitting rotation of the take-up reel hub 21 in the direction of the arrow c (in a direction to take-up the magnetic tape 2 on the take-up reel hub 21). Thus, a segment of the magnetic tape 2 extending between the take-up reel hub 21 and the supply reel hub 25 is held under tension.

A releasing operation of the first brake mechanism 40 is performed in a manner described below. After the compact size tape cassette is loaded in the video tape recorder, the brake-releasing pin 36 of the video tape recorder is inserted into the vertical pin-receiving hole 16 (FIG. 27) of the lower shell 5 from the bottom thereof. The brake-releasing pin 36, as it moves upwardly, first engages the oblique side wall 44 of the pin engagement portion 43 of the brake arm 41 and subsequently urges the pin engagement portion 43 in the direction of the arrow b, thereby causing the brake arm 41 to turn in the same direction about the support shaft 17 against the force of the spring 49. The angular movement of the brake arm 41 in the direction of the arrow b causes the locking pawl 42 to release the toothed gear 23 on the take-up reel hub 21.

Figure 29:
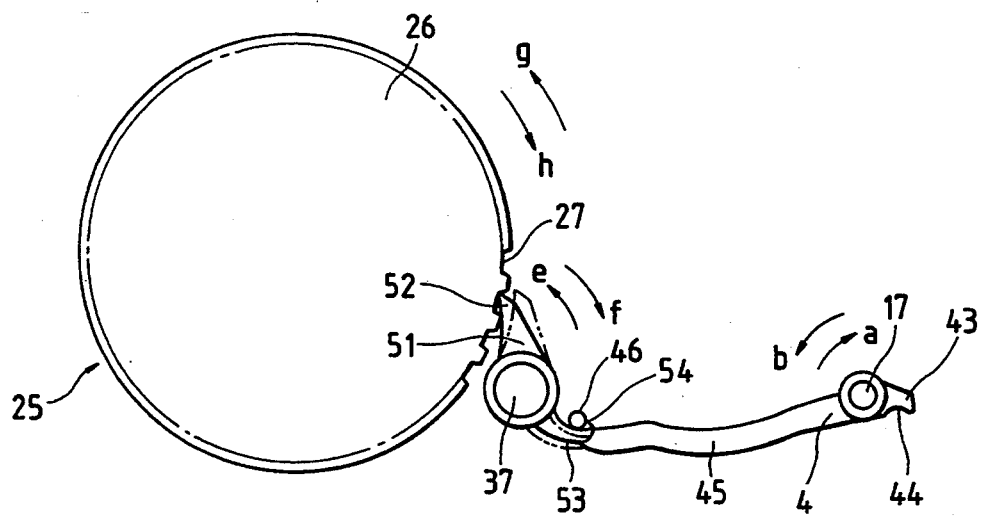
FIG. 29 is a plan view showing a second brake mechanism associated with a supply reel hub of the compact size tape cassette shown in FIG. 26.

As shown in FIGS. 26 and 29, the second brake mechanism 50 associated with the supply reel hub 25 is composed of a brake member 51 and a spring 59.

The brake member 51 is rotatably mounted on the second support shaft 37 upstanding from the inside surface of the lower shell 5 at a position adjacent to the supply reel hub 25. The spring 59 is a torsion coil spring loosely fitted around a cylindrical body of the brake member 51 and urges the brake member 51 to turn in a direction indicated by the arrow e.

The brake member 51 includes a locking pawl 52 normally held in mesh with the toothed gear 27 of the supply reel hub 25 by the force of the spring 59 tending to turn the brake member 51 in the direction of the arrow e, and a pin engagement portion 53 held in engagement with the actuating pin 46 of the first brake mechanism 40 and urged by the actuating pin 46 in a direction indicated by the arrow f (FIG. 29) to turn the brake member 51 in that direction about the support shaft 37. The pin engagement portion 53 has an engagement end surface 54 engageable with the actuating pin 46.

The pin engagement portion 53 of the brake member 51 which is engaged by the actuating pin 46 is normally urged in the direction of the arrow e by the force of the spring 59. However, the force of the spring 59 can readily be overcome by the angular movement of the brake arm 41 in the direction of the arrow b which is transmitted to the brake member 51 via the actuating pin 46. Thus, the locking pawl 52 and the brake member 51 can readily be turned about the support shaft 37 in the direction of the arrow f.

As shown in FIG. 29, the support shaft 37 upstanding from the inside surface of the lower shell 5 is located in a plane extending substantially in tangential relation to the periphery of the toothed gear 27 of the supply reel hub 25. With the support shaft 37 thus located, by properly selecting the shape of the locking pawl 52 of the brake member 51 journaled on the support shaft 37, it is possible to normally prevent the supply reel hub 25 from rotating in the direction of the arrow h (in a direction to slacken the magnetic tape 2 wound on the supply reel hub 25) while permitting rotation of the supply reel hub 25 in the direction of the arrow g (in a direction to wind up the magnetic tape 2 on the supply reel hub 25). Thus, a segment of the magnetic tape 2 extending between the take-up reel hub 21 and the supply reel hub 25 is normally tensioned in an adequate manner.

Since the first and second brake mechanisms 40 and 50 are interlocked with each other through an engagement between the actuating pin 46 and the pin engagement portion 53, a releasing operation of the second brake mechanism 50 takes place in synchronism with the releasing operation of the first brake mechanism 40.

More specifically, after the compact size tape cassette is loaded in the video tape recorder, the brake-releasing pin 36 (FIG. 26) of the video tape recorder is inserted into the vertical pin-receiving hole 16 (FIG. 27) of the lower shell 5 from the bottom thereof. During upward movement of the brake-releasing pin 36, the brake-releasing pin 36 first engages the oblique side wall 44 of the pin engagement portion 43 of the first brake mechanism 40 and subsequently urges the pin engagement portion 43 in the direction of the arrow b, thereby turning the brake arm 41 in that direction about the support shaft 17 against the force of the spring 49. Thus, the locking pawl 42 of the brake arm 41 is released from the toothed gear 23 on the take-up reel hub 21. At the same time, the angular movement of the locking pawl 42 of the brake arm 41 in the direction of the arrow b is transmitted to the pin engagement portion 53 of the brake member 51 via the actuating pin 46 which is disposed on the distal end of the arm 45 and held in engagement with the pin engagement portion 53. Thus, the pin engagement portion 53 is urged by the actuating pin 46 in the direction of the arrow b, so that the brake member 51 turns in the direction of the arrow f about the support shaft 37 against the force of the spring 59. The angular movement of the brake member 51 in this direction disengages the locking pawl 52 from the toothed gear 27 on the supply reel hub 25, as indicated by the phantom lines in FIG. 29.

As described above, the releasing operation of the second brake mechanism 50 (which is accomplished by disengagement between the locking pawl 52 of the brake member 51 and the toothed gear 27 of the supply reel hub 25) takes place in synchronism with the releasing operation of the first brake mechanism 40 (which is accomplished by disengagement between the locking pawl 42 of the brake arm 41 and the toothed gear 23 of the take-up reel hub 21). With the first and second brake mechanisms 40 and 50 thus interlocked, the supply reel hub 25 and the take-up reel hub 21 can be locked and released reliably and accurately. Preferably, the supply reel hub 25 and the take-up reel hub 21 are permitted to rotate in a direction such as to wind up the magnetic tape 2 on the respective reel hubs 25 and 21, so that a segment of the magnetic tape 2 extending between the reel hubs 25 and 21 can be held in a properly tensioned condition. With the magnetic tape 2 thus tensioned, it is no longer possible to withdraw the magnetic tape 2 from the housing 3 even when the magnetic tape 2 is pulled while the lid is being manually opened. The first and second brake mechanisms 40 and 50 firmly lock the take-up reel hub 21 and the supply reel 25 in position against accidental rotation even when the compact size tape cassette is subjected to an impact force or shock.

When the compact size tape cassette of the foregoing construction is allowed to stand while the reel hubs 21 and 25 are locked in position by the respective brake mechanisms 40 and 50 with the magnetic tape 2 held in an over-tensioned condition or stretched excessively, the over-tensioned magnetic tape 2 is likely to be permanently stretched or otherwise deformed or to deform a structural part of the tape cassette which guides the magnetic tape.

In order to overcome the foregoing problem, according to a first aspect of the present invention, either one or both of the actuating pin 46 (first engagement portion) of the first brake mechanism 40 and/or the pin engagement portion 53 (second engagement portion) of the second brake mechanism 50 has a projection so constructed as to reduce a spacing between the first engagement portion and the second engagement portion.

FIGS. 1 through 5 show a first embodiment of the present invention in which the engagement portion 53 of the brake member 51 has a projection 55, as best shown in FIG. 1.

Figure 2:
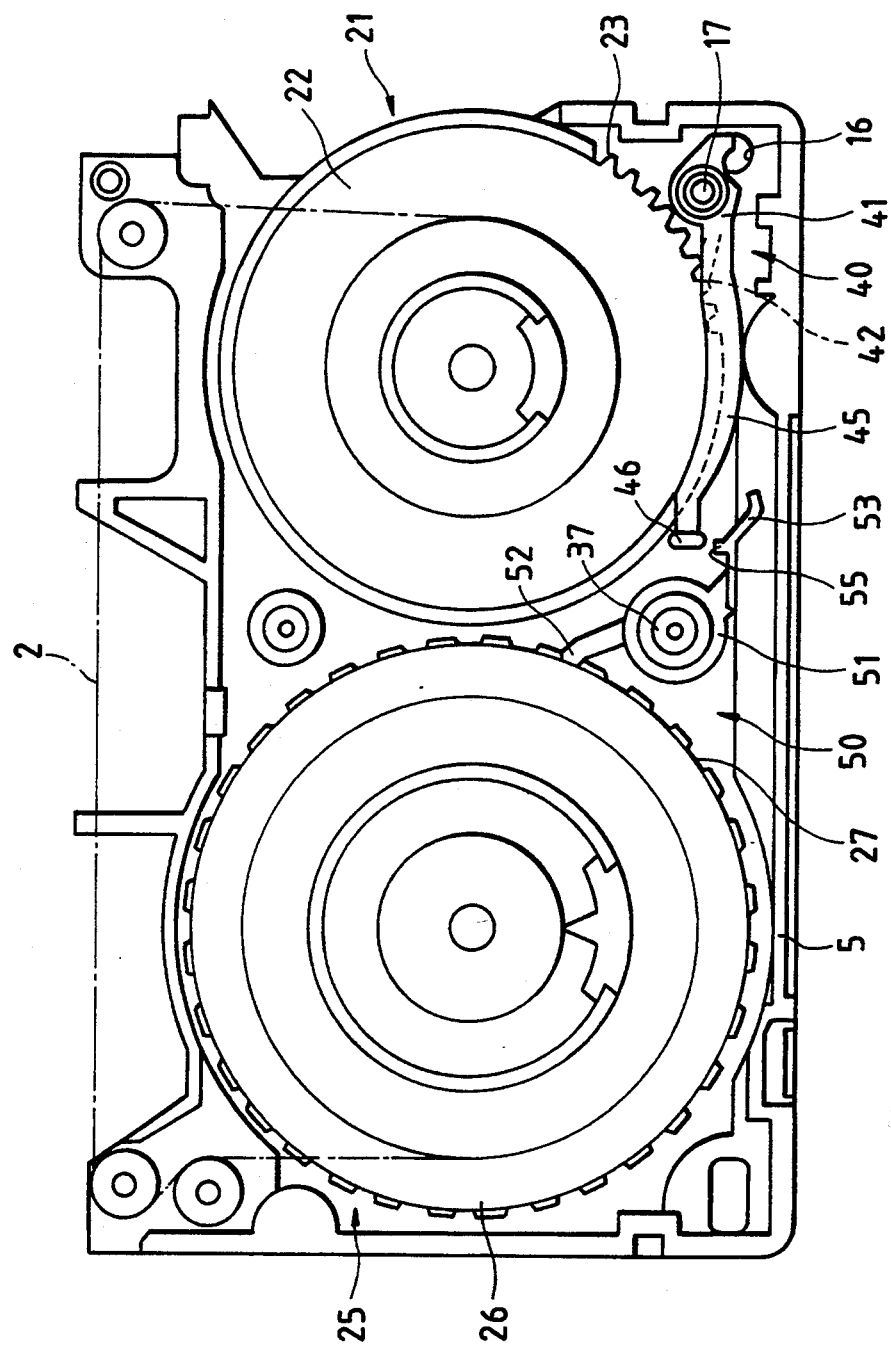
FIG. 2 is a plan view of the compact size tape cassette, with an upper shell omitted for clarity, showing the brake member separated from a brake arm.

As shown in FIG. 2, the first and second brake mechanisms 40 and 50 are normally disposed in an operating (braking) position in which the projection 55 provided on the engagement portion 53 of the brake member 51 is separated from the actuating pin 46 of the brake arm 41 by an appropriate distance or spacing.

Figure 5:
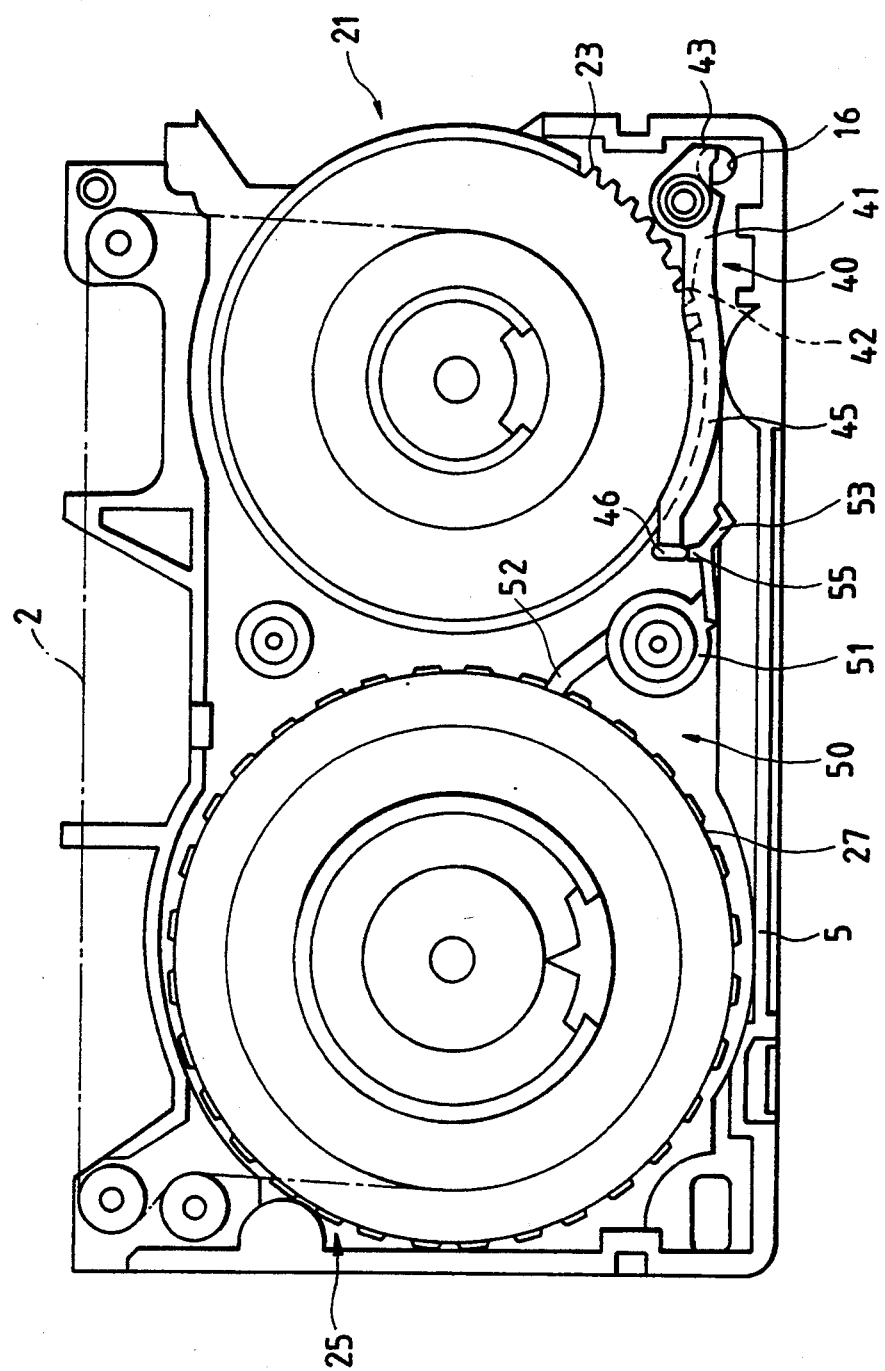
FIG. 5 is a view similar to FIG. 2, showing the movement of the brake member relative to the brake arm.

With this spacing, the brake member 51 is able to follow a free angular movement or play of the supply reel hub 25 within a predetermined angular range, independently of the movement of the brake arm 41, as shown in FIG. 5.

Figure 3:
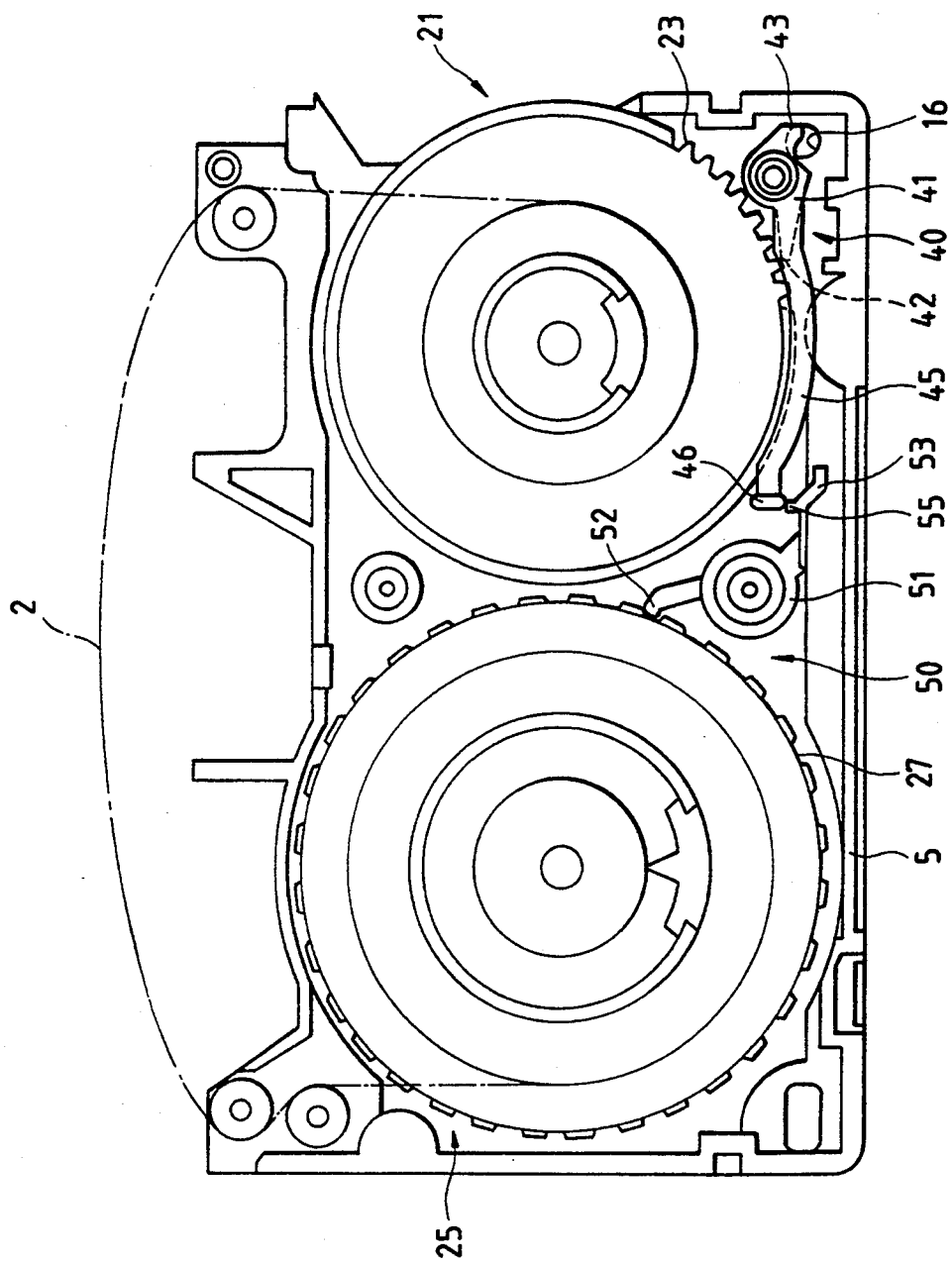
FIG. 3 is a view similar to FIG. 2, showing the operation of the brake member and the brake arm.

When the take-up reel hub 21 shown in FIG. 2 is forced to turn in a take-up direction (clockwise direction) to the position shown in FIG. 3, the locking pawl 42 of the brake arm 41 traces the contour of the individual teeth of the toothed gear 23 of the take-up reel hub 21. The locking pawl 42, as it slides on each tooth of the toothed gear 23 in a direction from the bottom to the top of the gear tooth, causes the brake arm 41 to turn in a direction (counter-clockwise direction in FIG. 3) to such an extent that the actuating pin 46 of the brake arm 41 moves through an angular distance greater than the space between the actuating pin 46 and the engagement portion 53 of the brake member 51. During that time, the actuating pin 46 engages the projection 55 on the brake member 51 and then urges the brake member 51 to turn in a direction (clockwise direction in FIG. 3) to release the supply reel hub 25 from locking engagement with the second brake mechanism 50.

The supply reel hub 25 thus released is permitted to turn in a direction (clockwise direction in FIG. 3) to pay out the magnetic tape 2.

As described above, when the take-up reel 21 is turned in a direction to take up a slack of the magnetic tape 2, the supply reel hub 25 is intermittently released from the second brake mechanism 50 and hence is rotatable intermittently to pay out the magnetic tape 2. Thus, overtensioning of the magnetic tape 2 can be avoided.

Figure 4:
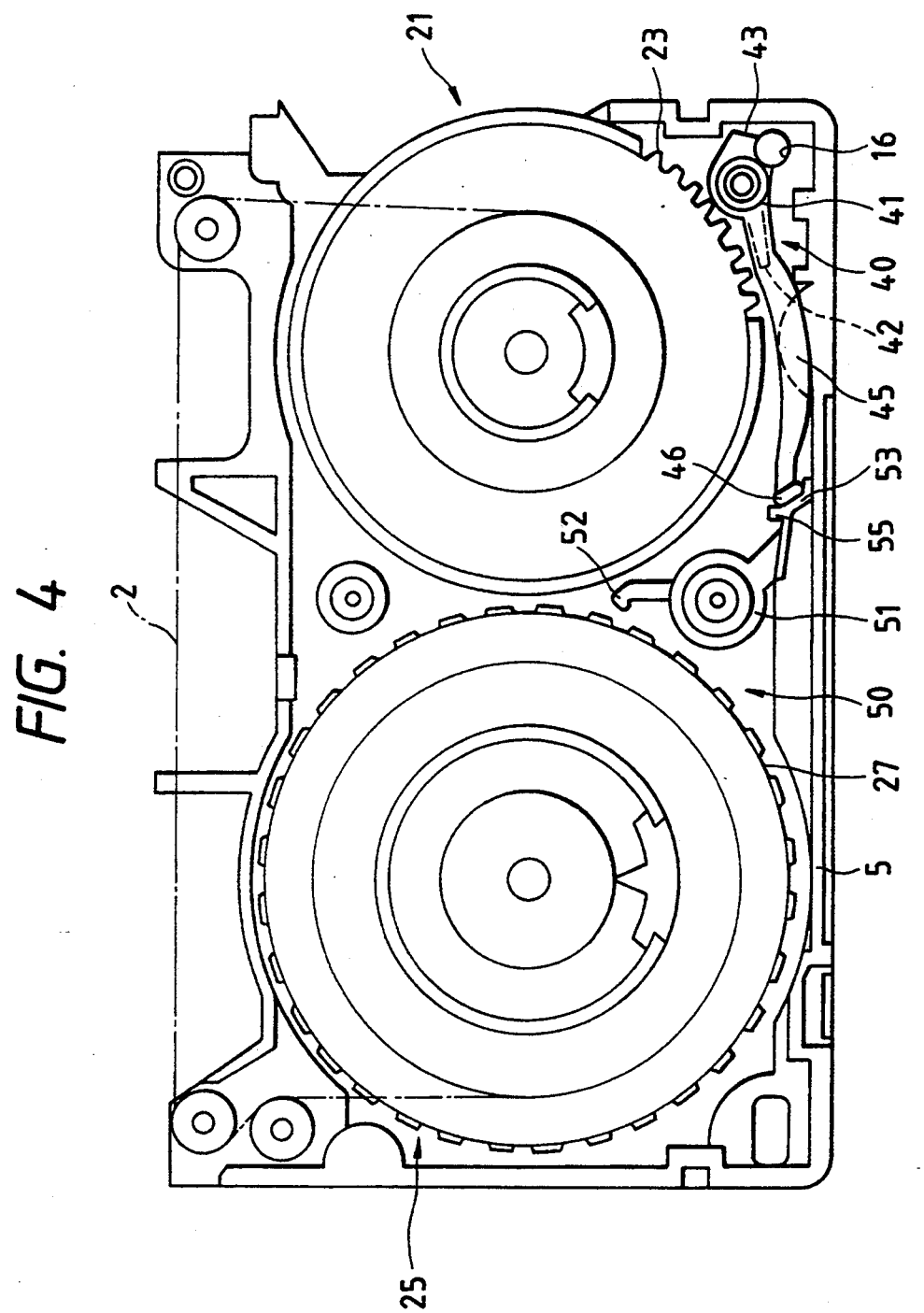
FIG. 4 is a view similar to FIG. 2, but showing the compact size tape cassette as it is loaded in a compact video tape recorder.

When the compact size tape cassette is received in the tape cassette adaptor or loaded in the compact video tape recorder, the first and second brake mechanisms 40 and 50 are released, as shown in FIG. 4. The brake releasing operation takes place in the same manner as described above with respect to the tape cassette shown in FIGS. 26-30.

Figure 6:
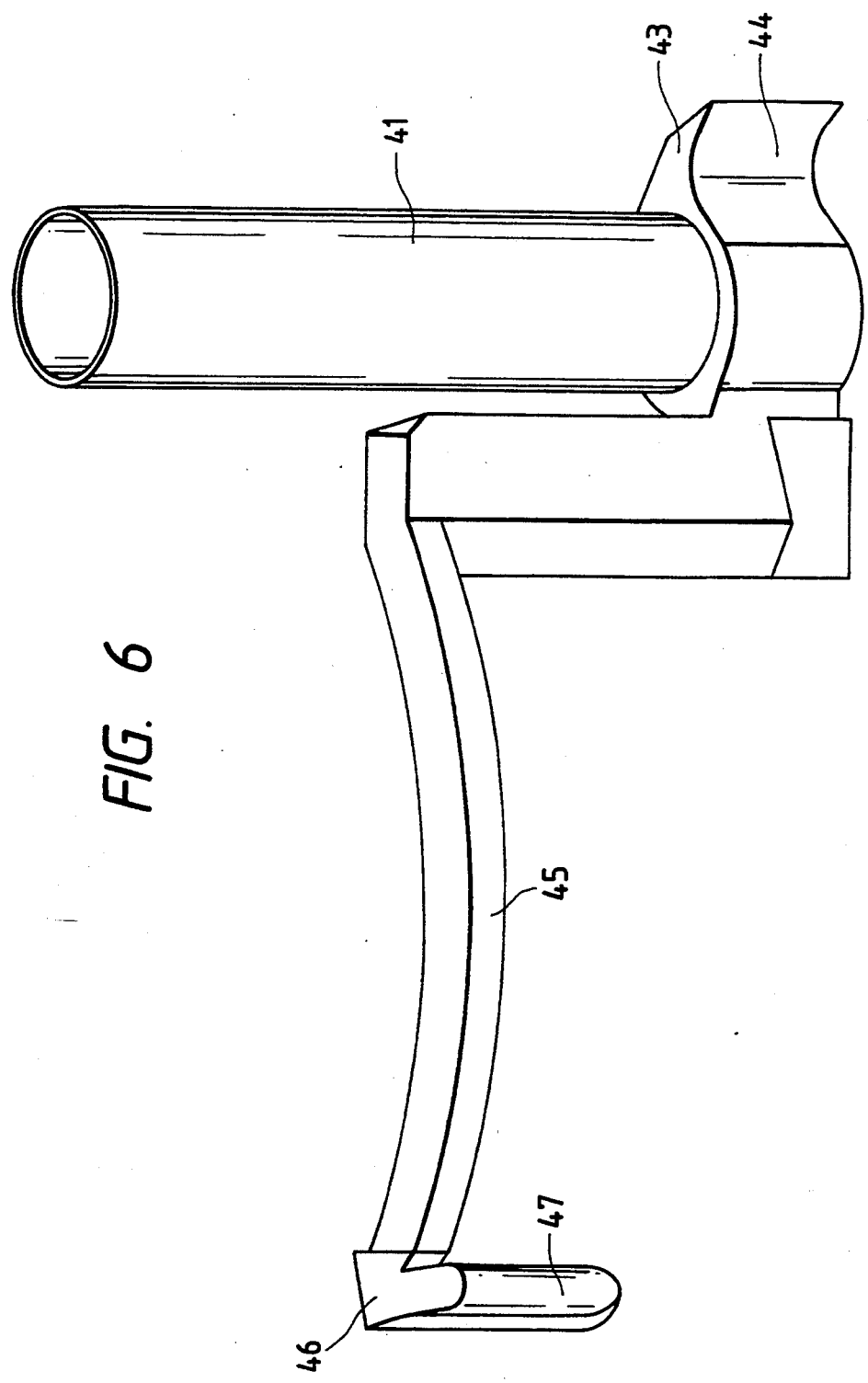
FIG. 6 is a perspective view of a brake arm of a compact size tape cassette according to a second embodiment of the present invention.

FIG. 6 shows a second embodiment of the present invention in which the actuating pin 46 of the brake arm 41 has a projection 47 constructed to reduce the spacing between the actuating pin 46 and the engagement portion 53 of the brake member 51. The projection 47 has the same function as the projection 55 on the brake arm 51 shown in FIG. 1. The brake arm 41 shown in FIG. 6 may be used in combination with the brake member 51 shown in FIG. 1 in which instance the height of the respective projections 47 and 55 is set appropriately.

As described above, in the compact size tape cassette according to the first and second embodiments of the present invention, the brake member 51 is turned in a brake-releasing direction to allow the supply reel hub 25 to turn intermittently in a direction to pay out the magnetic tape 2 in response to rotation of the take-up reel hub 21 in the take-up direction.

Figure 7:
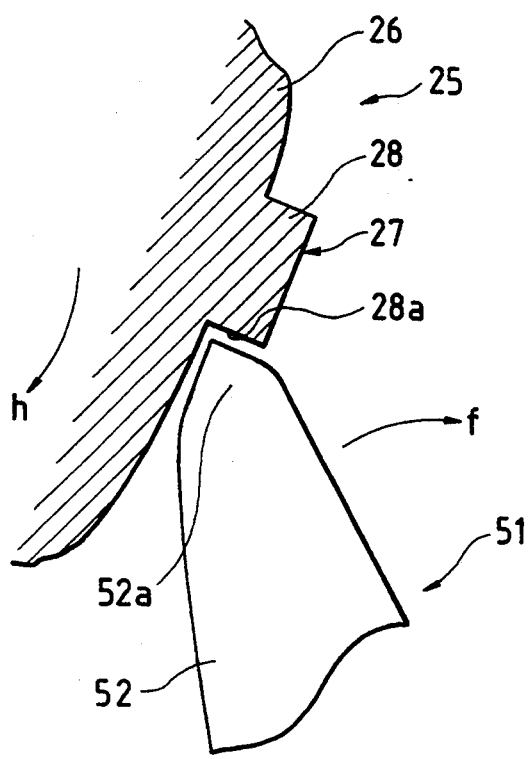
FIG. 7 is an enlarged view of a portion of a brake mechanism associated with a supply reel hub, showing a brake member caught by a toothed gear of the supply reel hub as it is moved in a brake releasing direction.

When the take-up reel hub 21 is turned in the take-up direction while the supply reel hub 25 is locked in position by the second brake mechanism 50, the supply reel hub 25 is urged by the tension of the magnetic tape 2 to turn in the direction of the arrow h shown in FIG. 7. In this instance, a slide wall or flank 28a of a tooth 28 of the tooth gear 27 abuts on a front end 52a of the locking pawl 52 before the locking pawl 52 of the brake member 51 turns in the direction of the arrow f. Thus, a further rotation of the brake arm 51 in the direction of the arrow f is no longer possible. Under such a condition, a braking force on the supply reel hub 25 is not released so that the magnetic tape 2 is tensioned excessively.

Figure 8:
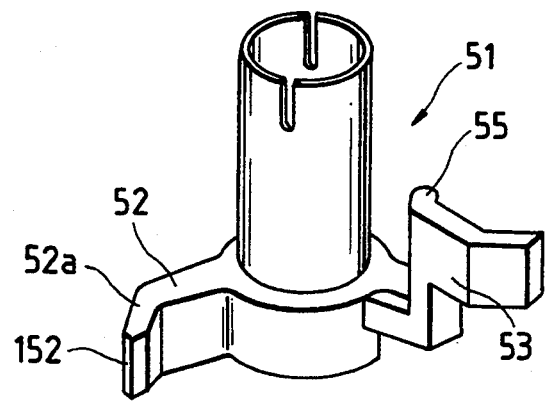
FIG. 8 is a perspective view of a brake member of a compact size tape cassette according to a third embodiment of the present invention.
Figure 9:
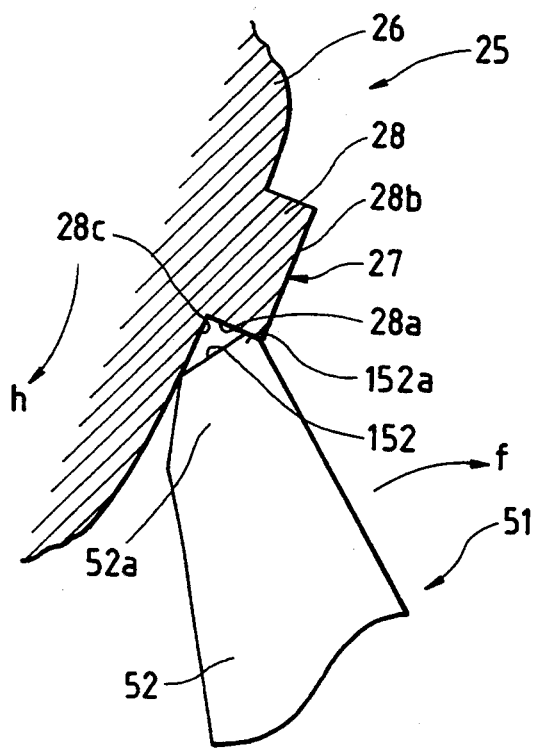
FIGS. 9 and 10 are enlarged views showing the operation of the brake member shown in FIG. 8.
Figure 10:
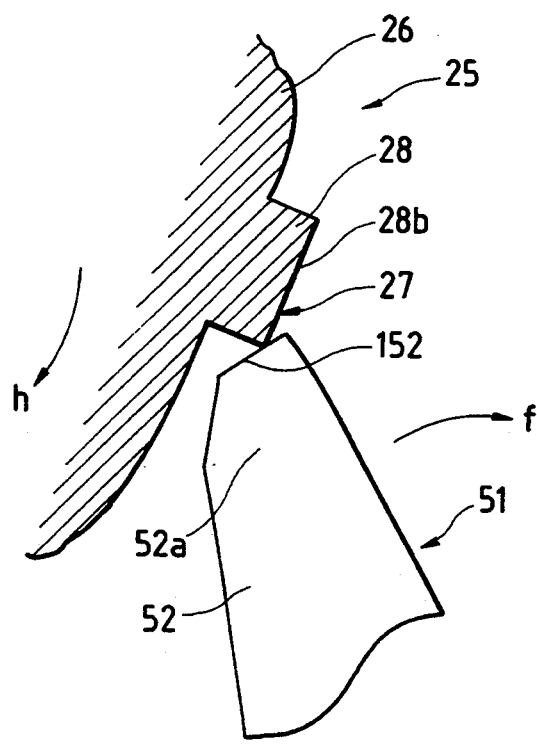

With the foregoing difficulty in view, according to a third embodiment of the present invention, a locking pawl 52 of the brake member 51 includes, as shown in FIGS. 8 through 10, a front end 52a formed by a flat front surface 152 extending obliquely to a crest 28b and a root 28c of each tooth 28 of the toothed gear 27 so as to ensure that the front end 52a of the locking pawl 52 is normally engaged only with a top end portion of the tooth 28. When the supply reel hub 25 is turned in the direction (tap pay-out direction) indicated by the arrow h in a manner described below, each tooth 28 is slidable on the flat front surface 152 of the locking pawl 52.

With this arrangement, when the brake arm 51 is disposed in an operating position shown in FIG. 9, one end edge 152a of the front surface 152 of the locking pawl 52 engages the flank 28a of one tooth 28 of the toothed gear 27 of the supply reel hub 25, so that the supply reel hub 25 cannot rotate in the direction (tape pay-out direction) indicated by the arrow h.

When the take-up reel hub 21 is turned in the take-up direction, with the magnetic tape 2 wound on the supply reel hub 25 and the take-up reel hub 21 without slack, the locking pawl 52 of the brake member 51 is urged to turn in the direction (brake-releasing direction) indicated by the arrow f. At the same time, the supply reel hub 25 is urged by the tension of the magnetic tape 2 to turn in the tape pay-out direction indicated by the arrow h. In this instance, an edge defined by the flank 28a and a tooth crest 28b of the tooth 28 is brought into contact with the front end surface 152 of the front end 52a of the locking pawl 52. A further angular movement of the supply reel hub 25 in the direction of the arrow h causes the tooth 28 to slide on the flat front surface 152 of the locking pawl 52 during which time the locking pawl 52 while being urged in the direction of the arrow f is able to turn smoothly in that direction. Thus, the supply reel hub 25 is released reliably and smoothly without causing an objectionable over-tensioning of the magnetic tape 2.

Figure 11:
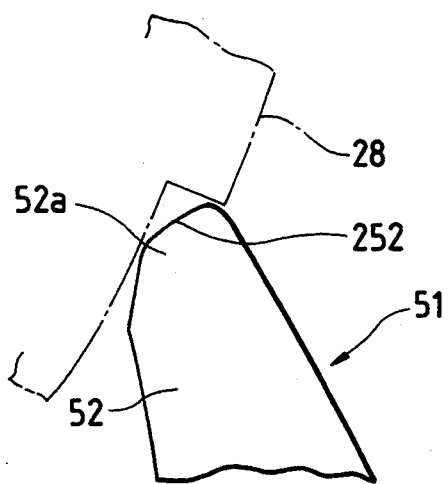
FIG. 11 is a view similar to FIG. 9, but showing a brake member according to a fourth embodiment of this invention.

FIG. 11 shows a fourth embodiment of this invention which is a modification of the third embodiment described above with reference to FIGS. 8-10. The fourth embodiment differs from the third embodiment in that the front surface 252 defining the front end portion 52a of the locking pawl 52 is an outwardly projecting curved surface. The curved front surface 252 operates in the same manner as the flat front surface 152 shown in FIGS. 8-10.

Figure 12:
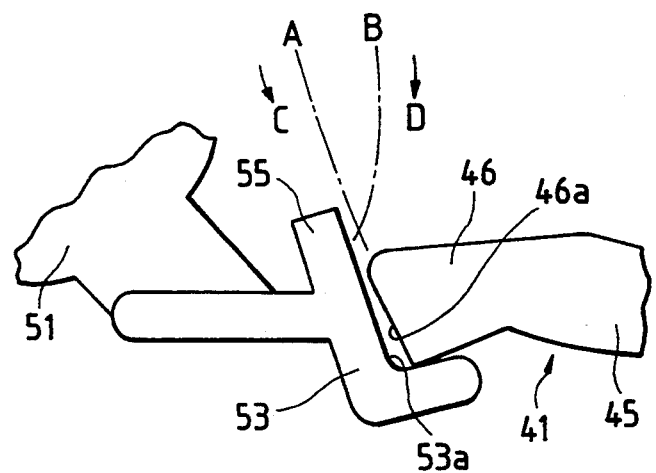
FIG. 12 is an enlarged view of a portion of the compact size tape cassette according to first and second embodiment of the invention, the view showing the brake member and the brake arm engaged together.
Figure 24:
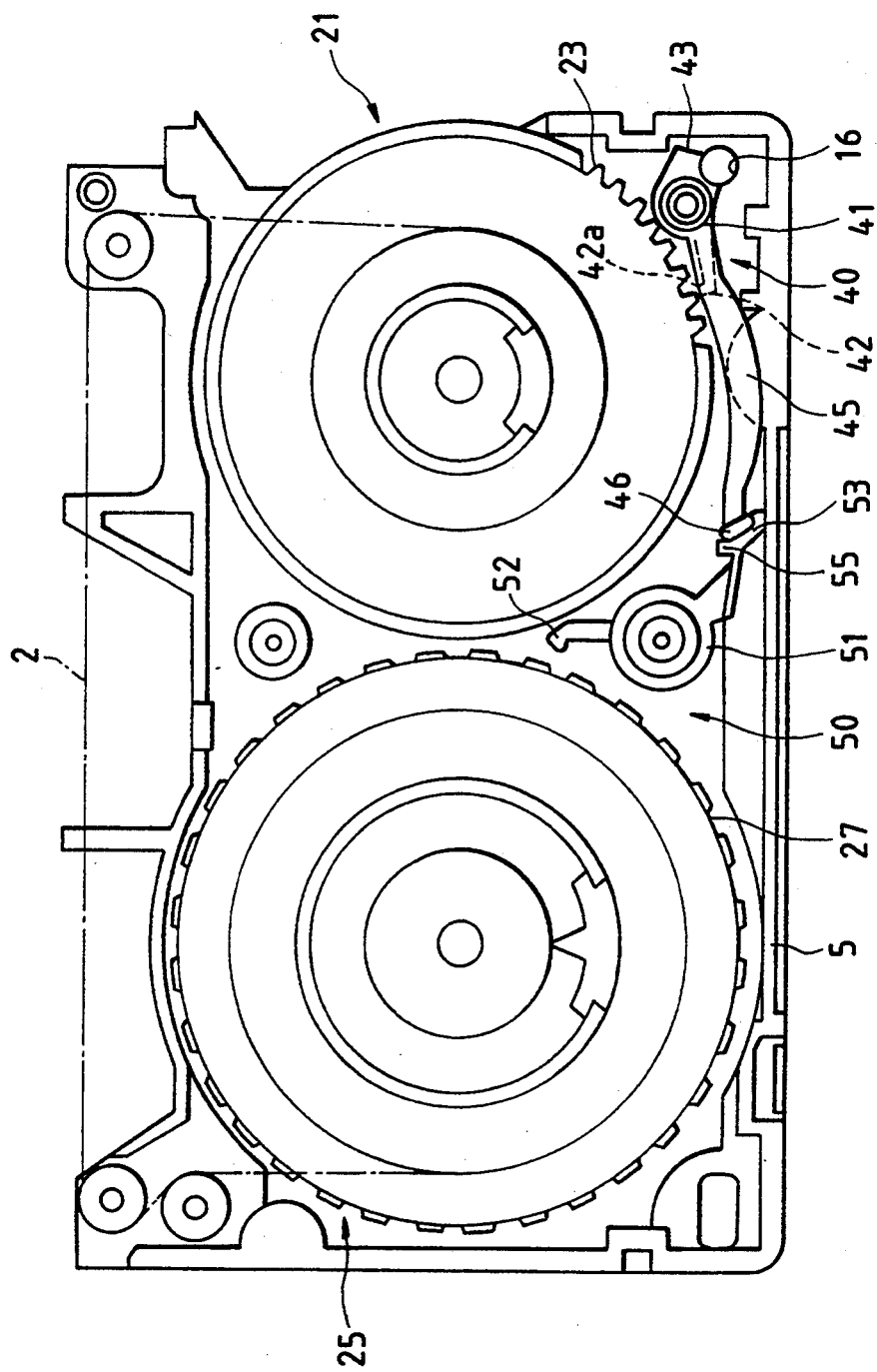
FIG. 24 is a view similar to FIG. 22, but showing the compact tape cassette as it is loaded in the compact video tape recorder.

When the compact size tape cassette according to the first embodiment described above is loaded in the compact video tape recorder, the actuating pin 46 of the brake arm 41 and the engagement portion 53 of the brake member 51 are engaged together as shown in FIG. 24. In this instance, as shown in FIG. 12, the actuating pin 46 moves in the direction of the arrow C along a path indicated by the dash-and-dot line A, while the engagement portion 53 move in the direction of the arrow D along a path indicated by the dash-and-dot line B.

More specifically, at first, the actuating pin 46 of the brake arm 41 moves in the direction of the arrow C along the path A. The actuating pin 46, as it moves along the path A, abuts on the engagement portion 53 of the brake member 51 whereupon the engagement portion 53 is caused to move in the direction of the arrow D along the path B. Continuing movement of the actuating pin 46 and the engagement portion 53 causes a flat contact surface 46a of the actuating pin 46 to slide along a flat contact surface 53a of the engagement portion until the actuating pin 46 and the engagement portion 53 are disposed in the position shown in FIG. 12.

Figure 13:
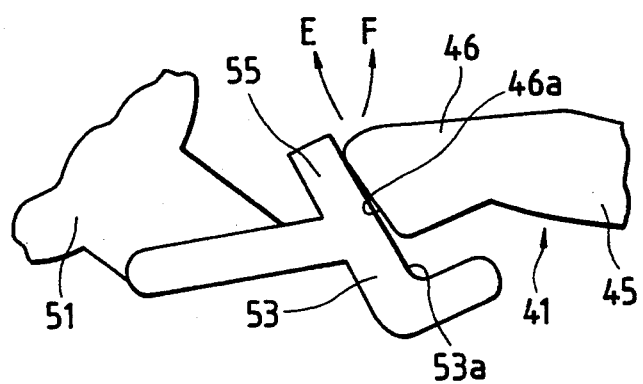
FIG. 13 is a view similar to FIG. 12, showing the brake member and the brake arm sticking together in the course of a return stroke to their original braking positions.

When the compact size tape cassette is removed from the compact video tape recorder, the brake arm 41 and the brake member 51 return to their original positions under the force of the springs 49 and 59 (FIG. 26), respectively, by reversing the preceding sequence of movements. During that time, however, it may occur that, due to a timing error caused mainly by cumulative tolerances of the related parts, the flat contact surfaces 46a and 53a stick together, as shown in FIG. 13. The return stroke of the actuating pin 46 and the engagement portion (that is, the movement of the actuating pin 46 in the direction of the arrow E and the movement of the engagement portion 53 in the direction of the arrow F) cannot take place. To cope with this problem, the force of the springs 49 and 59 may be increased. However, this attempt will interfere with the brake-releasing operation of the first and second brake mechanisms 40 and 50.

Figure 14:
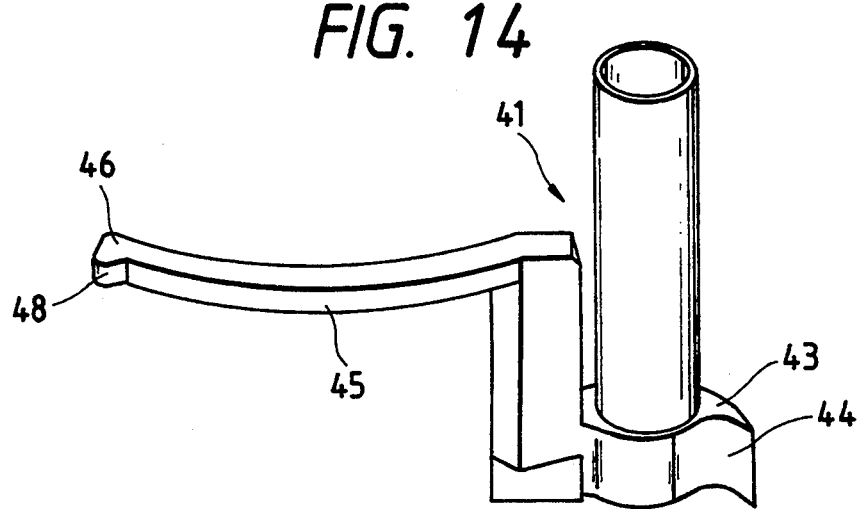
FIG. 14 is a perspective view showing a brake arm of a compact size tape cassette according to a fifth embodiment of the present invention.
Figure 15:
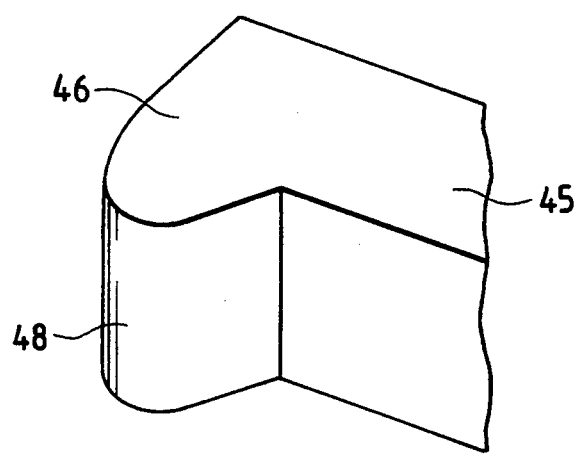
FIG. 15 is an enlarged view of a portion of FIG. 14, showing a curved contact portion of the brake arm.
Figure 16:
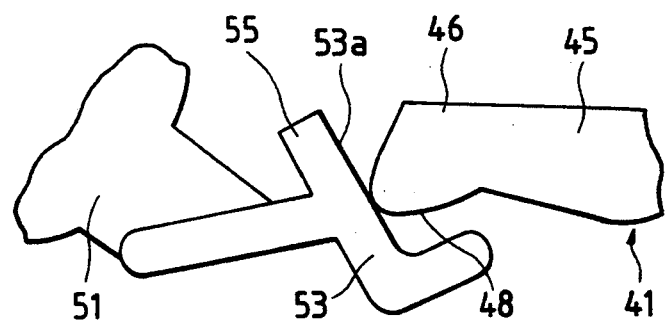
FIG. 16 is a view illustrative of the operation of the curved contact portion of the brake arm.

The foregoing difficulty can be overcome by an arrangement according to a fifth embodiment of this invention shown in FIGS. 14 to 16. According to this embodiment, the actuating pin 46 of the brake arm 41 has a curved contact portion 48 engageable with the engagement portion 53 of the brake member 51. The curved contact portion 48 is formed by a substantially arcuate outwardly projecting surface and extends throughout the length of the actuating pin 46.

With the use of the curved contact portion 48, the contact area between the actuating pin 46 and the engagement portion 53 is small, so that when the brake arm 41 and the brake member 51 return to their original positions under the force of the springs 49 and 59, respectively, the curved contact portion 48 is able to smoothly slide on the flat contact surface 53a of the engagement portion 53 without causing sticking at a position where the path of movement of the actuating pin 46 of the brake arm 41 and the path of movement of the engagement portion 53 of the brake member 51 interfere with each other.

Figure 17:
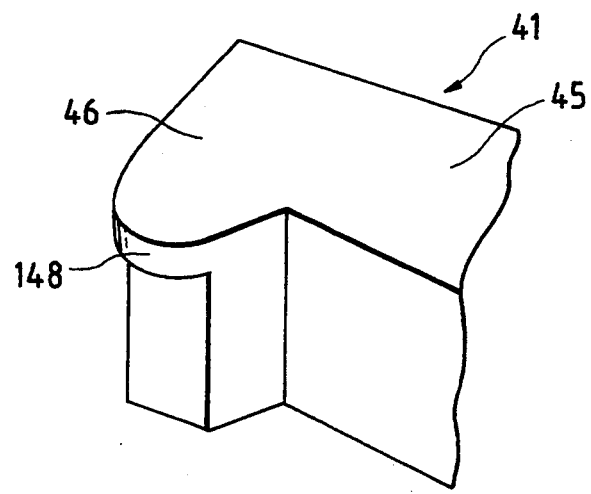
FIG. 17 is a perspective view of a portion of a brake arm according to a sixth embodiment of this invention.

FIG. 17 shows a sixth embodiment of this invention in which a curved contact portion 148 having a substantially arcuate outwardly projecting surface is formed only on an upper part of the actuating pin 46. The lower part of the actuating pin 46 is offset. The curved contact portion 148 is shorter than the curved contact portion 48 shown in FIG. 15 and hence a friction acting between the curved contact portion 148 and the contact surface 53a (FIG. 16) of the engagement portion 53 is smaller than that produced in the case of the curved contact portion 48. Thus, the curved contact portion 148 is slidable more smoothly than the curved contact portion 48. The position of the curved contact portion 148 shown in the illustrated embodiment should be construed as illustrative rather than restrictive. The offset lower part of the actuating pin 46 may be replaced by a sloped surface blending at an upper end with the lower end of the surface of the curved contact portion 148.

Figure 18:
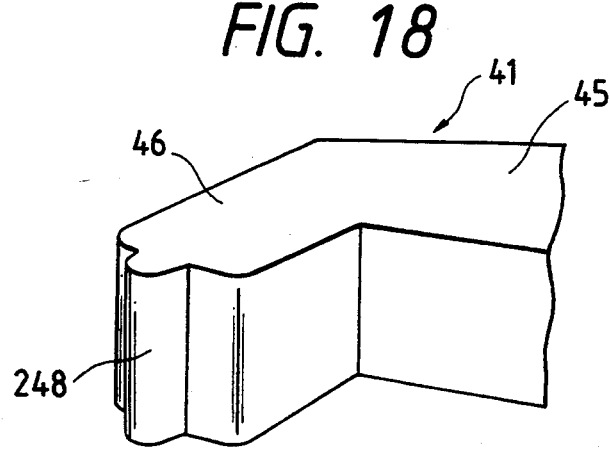
FIG. 18 is a perspective view of a portion of a brake arm according to a seventh embodiment of the present invention.

FIG. 18 illustrates a seventh embodiment of the present invention in which a curved contact portion 248 having a smaller radius of curvature than the curved contact portion 48 shown in FIG. 15 is provided on the actuating pin 46 of the brake lever 45. Due to a smaller friction acting between the curved contact portion 248 and the contact surface 53a (FIG. 16) of the engagement portion 53, the curved contact portion 248 slides more smoothly than the curved contact portion 48 shown in FIG. 15.

Figure 19:
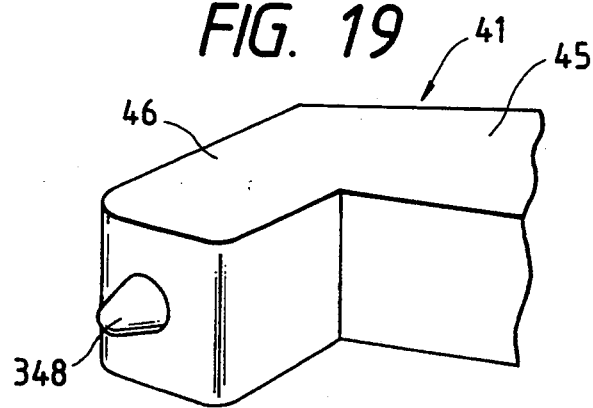
FIG. 19 is a perspective view of a portion of a brake arm according to an eighth embodiment of the present invention.
Figure 20:
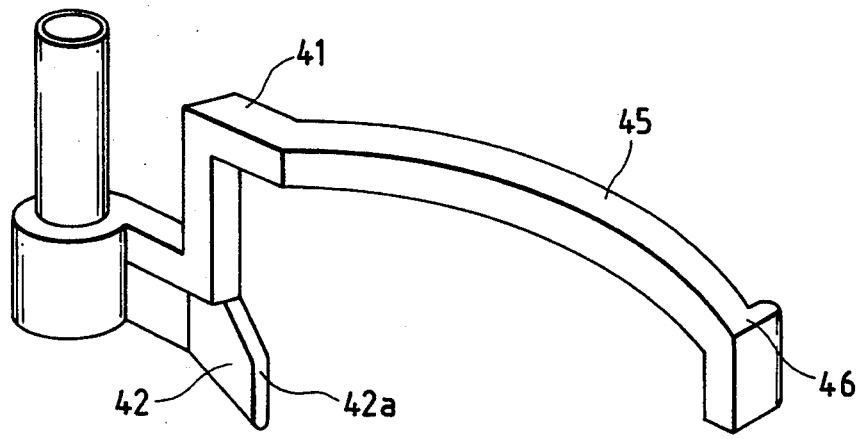
FIG. 20 is a perspective view of a brake arm according to a ninth embodiment of the present invention.

FIG. 19 shows an eighth embodiment of this invention in which the actuating pin 46 has a curved contact portion 348 in the form of a substantially semi-spherical projection disposed on a central portion of the actuating pin 46. Due to a point contact, the semi-spherical projection 348 slides more smoothly than the curved contact portion 48 shown in FIG. 15. The position of the curved contact portion 348 shown in FIG. 19 should be construed as illustrative rather than restrictive.

The fifth embodiment or the sixth embodiment may be combined with the third embodiment or the fourth embodiment.

FIGS. 20 through 25 illustrates a ninth embodiment of the present invention according to which the locking pawl 42 of the brake arm 41 has a projection 42a at its front end. The projection 42a is normally held in mesh with teeth of the toothed gear 23 of the take-up reel hub 21. When the take-up reel hub 21 is rotated in a direction to take up the magnetic tape 2, the projection 42a slides on the teeth of the toothed gear 23, thereby intermittently releasing the second brake mechanism 50 (FIG. 22) associated with the supply reel hub 25.

Figure 21A:
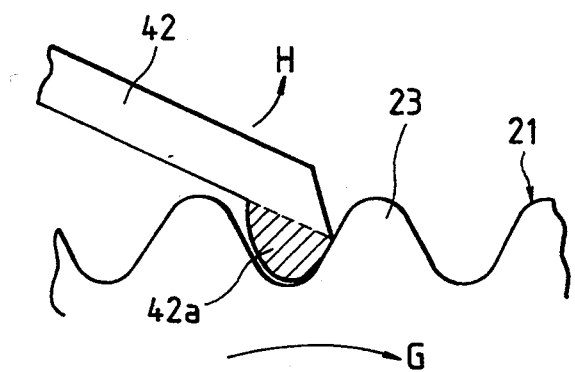
FIGS. 21A and 21B are diagrammatical views illustrative of the operation of the brake arm shown in FIG. 20.
Figure 21B:
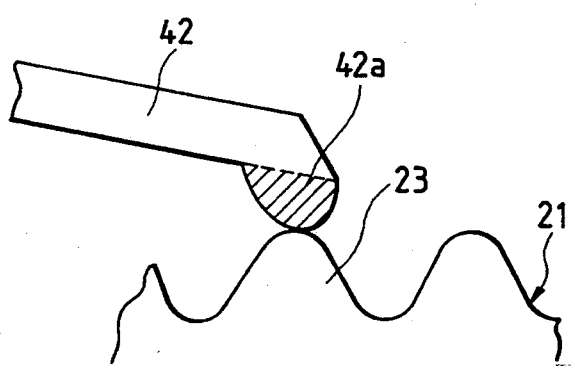

More specifically, when the take-up reel hub 21 shown in FIG. 21A is turned in a direction (take-up direction) indicated by the arrow G for taking up the magnetic tape 2 (FIG. 22), the projection 42a indicated by hatching for clarity moves along the profile of a tooth of the toothed gear 23, thereby turning the locking pawl 42 in the direction of the arrow H, as shown in FIG. 21B. In this instance, the extent of an angular movement of the locking pawl 42 having the projection 42a is greater than that of an angular movement of a locking pawl 42 devoid of the projection 42a by an amount equal to the height of the projection 42a. This means that the amount of movement of the actuating pin 46 (FIG. 20) of the brake arm 41 is enlarged by the projection 42a provided on the front end of the locking pawl 42.

The operation of the arrangement according to the ninth embodiment will be described below with reference to FIGS. 22 to 25.

Figure 22:
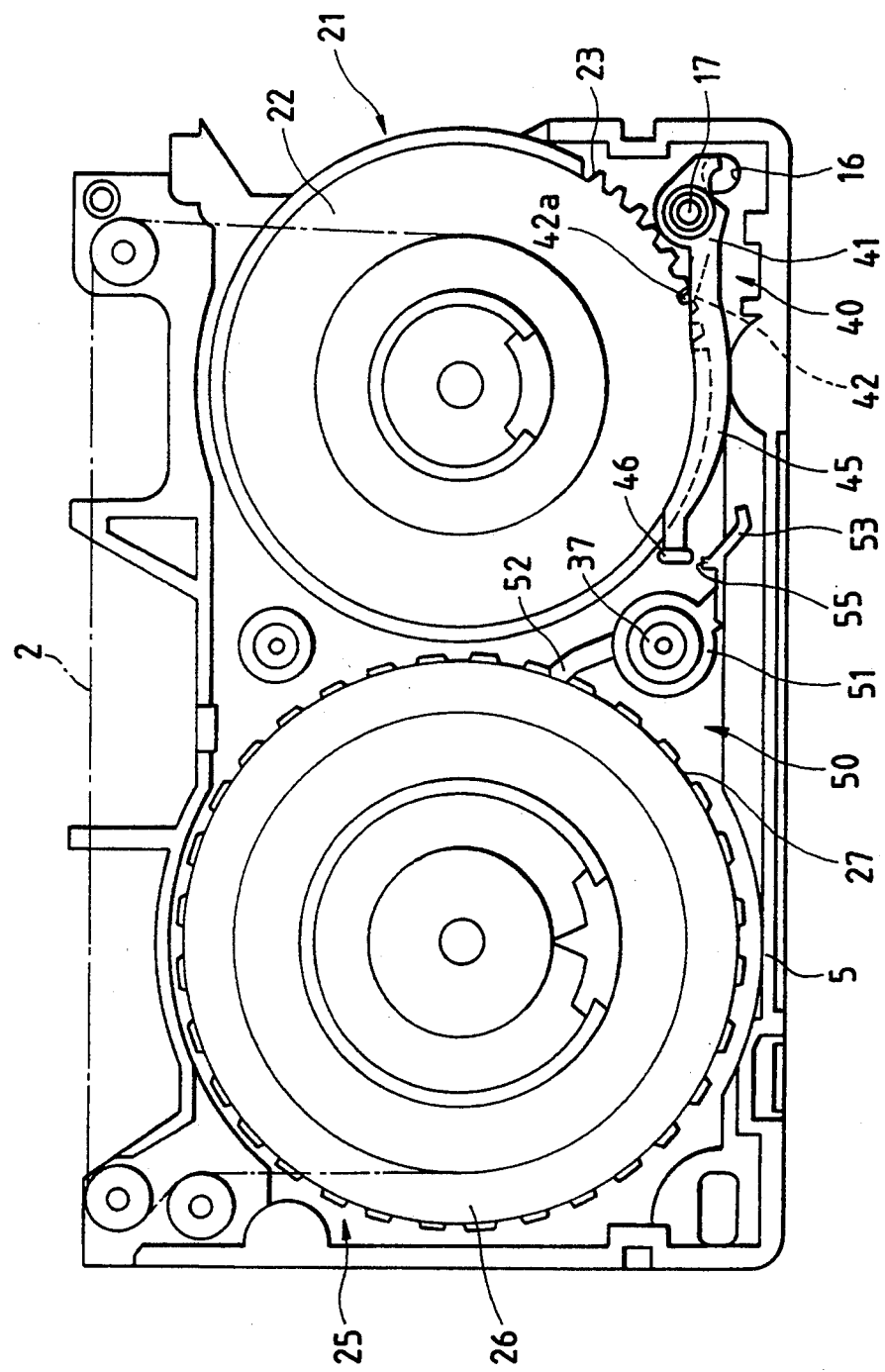
FIGS. 22 and 23 are plan views of a compact tape cassette, illustrating of the manner in which the brake arm shown FIG. 20 operates.

As shown in FIG. 22, the first and second brake mechanisms 40 and 50 are normally disposed in the operating (braking) position in which the actuating pin 46 of the brake arm 41 and the projection 55 on the engagement portion 53 of the brake member 51 are separated from one another by an appropriate distance or spacing.

Figure 25:
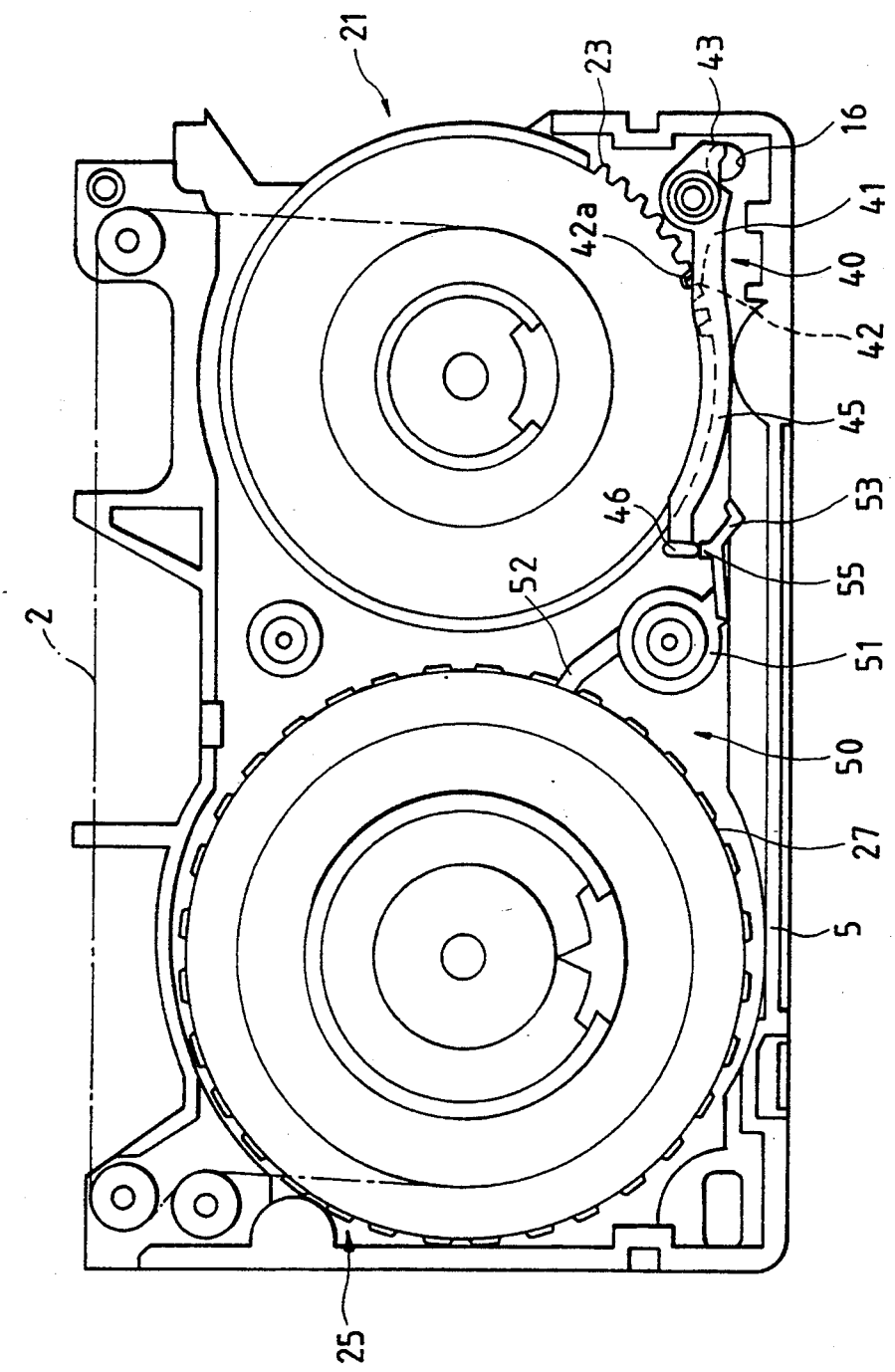
FIG. 25 is a view similar to FIG. 22, showing the movement of a brake member relative to the brake arm.

With this spacing, the brake member 51 is able to follow a free angular movement or play of the supply reel hub 25 within a predetermined angular range, independently of the movement of the brake arm 41, as shown in FIG. 25.

Figure 23:
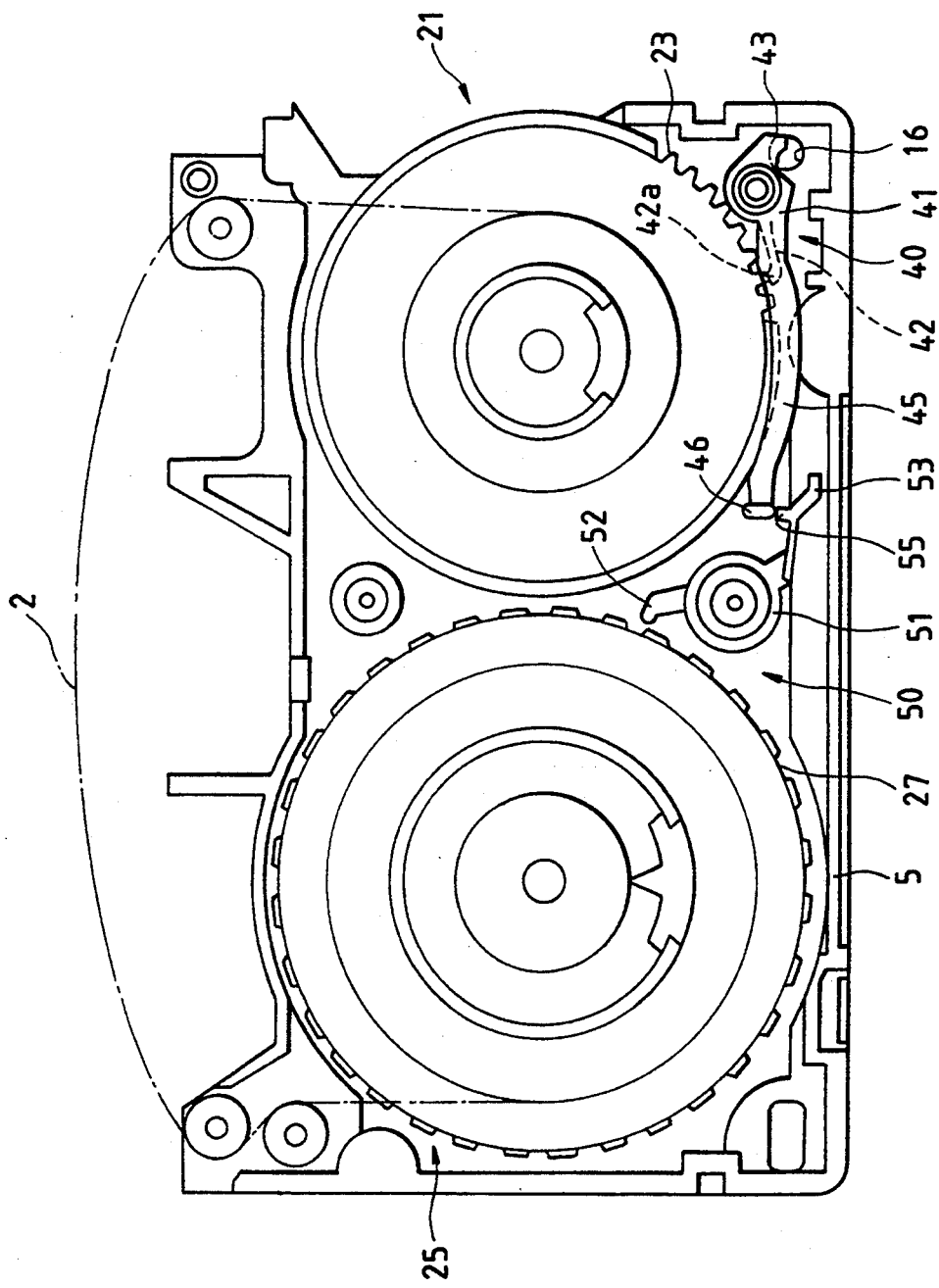

When the take-up reel hub 21 shown in FIG. 22 is forced to turn in a take-up direction (clockwise direction) to the position shown in FIG. 23, the locking pawl 42 of the brake arm 41 traces the contour of the individual teeth of the toothed gear 23 of the take-up reel hub 21. In this instance, since the locking pawl 42 is provided with the projection 42a at its front end, the projection 42a on the locking pawl 42, as it slides on each tooth of the toothed gear 23 in a direction from the bottom to the top of the gear tooth, causes the brake arm 41 to turn in a direction (counterclockwise direction in FIG. 23) to such an extent that the actuating pin 46 of the brake arm 41 moves through an angular distance greater than the spacing between the actuating pin 46 and the engagement portion 53. During that time, the actuating pin 46 engages the projection 55 on the brake member 51 and then urges the brake member 51 to turn in a direction (clockwise direction in FIG. 23), thereby releasing the supply reel hub 25 from locking engagement with the second brake mechanism 50.

The supply reel hub 25 thus released is permitted to turn in a direction (clockwise direction in FIG. 23) to pay out the magnetic tape 2.

As described above, when the take-up reel 21 is turned in a direction to take up a slack of the magnetic tape 2, the supply reel hub 25 is intermittently released from the second brake mechanism 50 and hence is rotatable intermittently to pay out the magnetic tape 2. Thus, over-tensioning of the magnetic tape 2 can be avoided.

When the compact size tape cassette is received loaded in the compact video tape recorder, the first and second brake mechanisms 40 and 50 are released, as shown in FIG. 24. The brake releasing operation takes place in the same manner as described above with respect to the tape cassette shown in FIGS. 26–30.

Obviously, various minor changes and modifications of the present invention are possible in light of the above teaching. It is therefore to be understood that within the scope of the appended claims the invention may be practiced otherwise than as specifically described.

What is claimed is:

1. A compact size tape cassette comprising:
   (a) a housing;

(b) first and second reel hubs rotatably mounted within the housing with a magnetic tape wound around both of the reel hubs;
(c) a rotatably mounted driving brake mechanism and a rotatably mounted driven brake mechanism for braking the first and second reel hubs, respectively;
(d) the driving brake mechanism having-
   a first body portion;
   a first end contacting a release pin to induce pivotal movement of the first body portion;
   a first pawl engaging gear teeth integral with the first reel hub; and
   a driving portion at an opposite end to abut a driven portion of the driven brake mechanism to release the driven brake mechanism when the driving brake mechanism is released;
(e) the driven brake mechanism having-
   a second body portion having the driven portion at an end thereof;
   a second pawl located at an other end of the second body portion to engage gear teeth integral with the second reel hub; and
(f) the driving and driven portions having a predetermined spacing therebetween when the braking mechanisms brake, the spacing being effected to allow one of the driving and driven portions to be displaced within a given play free of contact with the other in response to a corresponding displacement of one of the reel hubs while being braked, the spacing further allowing the driving portion of the driving brake mechanism to abut and displace the driven portion of the driven brake mechanism so as to release the driven brake mechanism when the first reel hub is rotated in a direction to take up the magnetic tape sufficiently to cause the first pawl to slide over the gear teeth.

2. The cassette set forth in claim 1 further comprising:
annular flanges formed on the reel hubs;
the driving and driven brake mechanisms including respective first and second gears formed in their corresponding annular flanges;
means for normally biasing the first body portion in a given direction causing meshing of the first pawl and the first gear in the first reel hub flange;
means for normally biasing the second body portion in a given direction causing meshing of the second pawl and the second gear in the second reel hub flange.

3. A compact size tape cassette according to claim 2, wherein said first pawl has a projection at its front end, said projection being normally held in mesh with the first gear, said projection being slidable on said teeth for intermittently releasing said driven brake mechanism when said first reel hub is rotated in a direction to take up said magnetic tape.

4. A compact size tape cassette according to claim 2, wherein said second pawl has a front surface extending obliquely to a crest of each tooth of said second gear, said front surface being dimensioned such that when said second reel hub is turned in a direction to pay out said magnetic tape, teeth of said second gear are slidable on said front surface of said second pawl.

5. A compact size tape cassette according to claim 4, wherein said front surface is a flat surface.

6. A compact size tape cassette according to claim 4, wherein said front surface is an outwardly projecting curved surface.

7. A compact size tape cassette according to claim 2, wherein said driving portion includes an outwardly projecting curved contact portion engageable with said driven portion of the second body portion.

8. A compact size tape cassette according to claim 7, wherein said driving portion has a thickness and said curved contact portion extends throughout the thickness.

9. A compact size tape cassette according to claim 7, wherein said driving portion has a thickness and said curved contact portion extends over only a part of the thickness.

10. A compact size tape cassette according to claim 7, wherein said curved contact portion is a substantially semi-spherical projection.

11. The cassette set forth in claim 1 further comprising:
annular flanges formed on the reel hubs;
the driving and driven brake mechanisms including respective first and second gears formed in their corresponding annular flanges;
means for normally biasing the first body portion in a given direction causing meshing of the first pawl and the gear in the first reel hub flange;
means for normally biasing the second body portion in a given direction causing meshing of the second pawl and the gear in the second reel hub flange.

12. A compact size tape cassette comprising:
(a) a housing;
(b) first and second reel hubs rotatably mounted within the housing with a magnetic tape wound around both of the reel hubs, the second reel hub having an annular flange with a gear formed therein;
(c) a rotatably mounted driving brake mechanism and a rotatably mounted driven brake mechanism for braking the first and second reel hubs, respectively;
(d) the driving brake mechanism having-
   a first body portion;
   a first end contacting a release pin to induce pivotal movement of the first body portion;
   a first pawl normally engaging gear teeth integral of a first reel hub; and
   a driving portion at an opposite end to abut a driven portion of the driven brake mechanism to simultaneously release the driven brake mechanism when the driving brake mechanism is released;
(e) the driven brake mechanism having-
   a second body portion having the driven portion at an end thereof; and
   a second pawl located at an other end of the second body portion and normally meshed with gear teeth on the second reel hub, the second pawl having a front surface extending obliquely to a crest of each of the teeth, the front surface being dimensioned such that when the second reel hub is turned in a direction to pay out the tape, the teeth are slidable on the front surface.

13. A compact size tape cassette according to claim 12, wherein said front surface is a flat surface.

14. A compact size tape cassette according to claim 12, wherein said front surface is an outwardly projecting curved surface.

* * * * *